US012596706B1

(12) United States Patent
Chaturvedi et al.

(10) Patent No.: US 12,596,706 B1
(45) Date of Patent: Apr. 7, 2026

(54) OUT-OF-BAND SCHEMA TRACKING FOR CHANGE-DATA-CAPTURE LOGS

(71) Applicant: Amazon Technologies, Inc., Seattle, WA (US)

(72) Inventors: Kanishka Chaturvedi, New York, NY (US); Andrew Willis Callahan, Seattle, WA (US); Kunal Anil Lillaney, Seattle, WA (US); Punit Rajgaria, Saratoga, CA (US); Md Arif, Santa Clara, CA (US)

(73) Assignee: Amazon Technologies, Inc, Seattle, WA (US)

( * ) Notice: Subject to any disclaimer, the term of this patent is extended or adjusted under 35 U.S.C. 154(b) by 0 days.

(21) Appl. No.: 18/759,514

(22) Filed: Jun. 28, 2024

(51) Int. Cl.
    *G06F 16/23* (2019.01)
    *G06F 16/21* (2019.01)

(52) U.S. Cl.
    CPC ........ *G06F 16/2379* (2019.01); *G06F 16/212* (2019.01); *G06F 16/2358* (2019.01)

(58) Field of Classification Search
    CPC . G06F 16/2379; G06F 16/212; G06F 16/2358
    USPC ....................................... 707/672, 703, 813
    See application file for complete search history.

(56) References Cited

U.S. PATENT DOCUMENTS

| | | | |
|---|---|---|---|
| 10,002,175 B2 | 6/2018 | Kemper et al. | |
| 10,346,434 B1 | 7/2019 | Morkel et al. | |
| 10,372,926 B1 | 8/2019 | Leshinsky et al. | |
| 10,929,428 B1 | 2/2021 | Brahmadesam | |
| 11,200,332 B2 | 12/2021 | Leshinsky et al. | |
| 12,007,983 B2 | 6/2024 | Pandis et al. | |
| 2005/0262097 A1 | 11/2005 | Sim-Tang et al. | |
| 2009/0157767 A1* | 6/2009 | Doty ................... | G06F 16/2365 |
| 2010/0005124 A1* | 1/2010 | Wagner .................. | G06F 16/27 707/E17.007 |
| 2011/0320403 A1 | 12/2011 | O'Krafka et al. | |
| 2014/0281273 A1* | 9/2014 | Kalekar .............. | G06F 12/0833 711/144 |
| 2016/0299932 A1 | 10/2016 | Pound et al. | |
| 2019/0294204 A1 | 9/2019 | Castro et al. | |
| 2019/0384775 A1 | 12/2019 | Wen et al. | |

(Continued)

FOREIGN PATENT DOCUMENTS

| | | |
|---|---|---|
| EP | 2467791 | 6/2012 |
| EP | 3961420 A1 | 3/2022 |

OTHER PUBLICATIONS

"Manassiev, et al., ""Exploiting Distributed Version Concurrency in a TransactionalMemory Cluster,"" PPoPP'06, 2006 ACM, pp. 1-11. ".

(Continued)

*Primary Examiner* — Baoquoc N To
(74) *Attorney, Agent, or Firm* — Alexander A. Knapp; Kowert, Hood, Munyon, Rankin & Goetzel, P.C.

(57) ABSTRACT

Methods for replicating transactional tables of a transactional database to a recipient system, such as an analytical database, and maintaining updates to those transactional table representations are disclosed. More particularly, change-data-capture items are generated by a transport engine, that is separate from a database engine for the transactional database. Also, schema data is maintained out-of-band from the database engine and is stitched with committed change payload contents by the transport engine.

20 Claims, 10 Drawing Sheets

(56) References Cited

U.S. PATENT DOCUMENTS

| | | |
|---|---|---|
| 2020/0210412 A1 | 7/2020 | van Gulik et al. |
| 2021/0326325 A1* | 10/2021 | Cseri ................... G06F 16/1865 |
| 2022/0027372 A1 | 1/2022 | Schreter |
| 2022/0100883 A1 | 3/2022 | Leshinsky et al. |
| 2024/0004860 A1 | 1/2024 | Soundararajan |
| 2024/0004897 A1 | 1/2024 | Pandis et al. |
| 2024/0386127 A1* | 11/2024 | Adogla ................. H04L 63/107 |

OTHER PUBLICATIONS

U.S. Appl. No. 17/810,318, filed Jun. 30, 2022, Pandis, et al.
U.S. Appl. No. 17/810,312, filed Jun. 30, 2022, Soundararajan.
U.S. Appl. No. 17/710,444, filed Mar. 31, 2022, Sreekantham, et al.
U.S. Appl. No. 17/710,459, filed Mar. 31, 2022, Papathanasiou, et al.
U.S. Appl. No. 17/710,476, filed Mar. 31, 2022, Papathanasiou, et al.

* cited by examiner

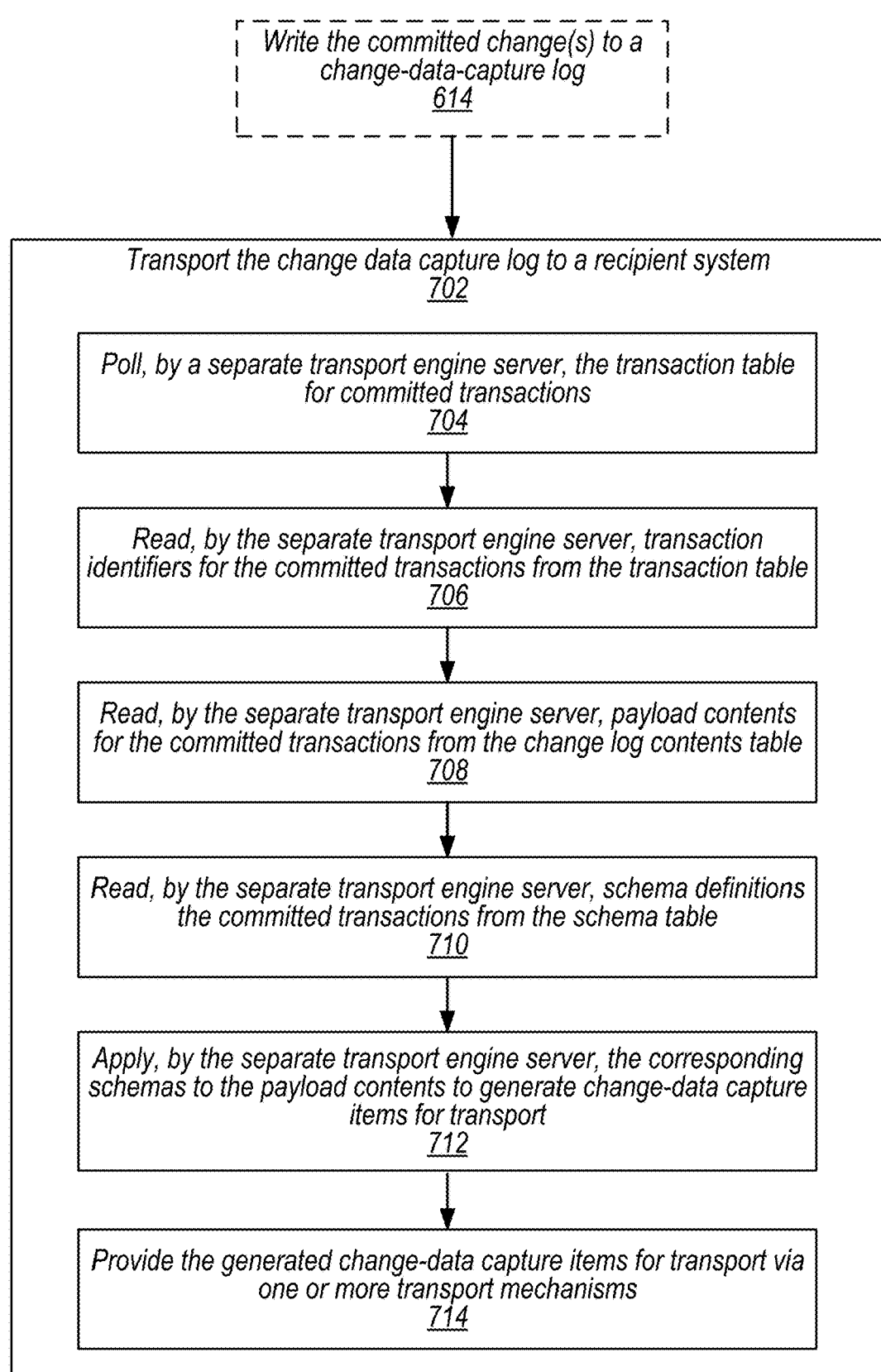

*Write the committed change(s) to a change-data-capture log*
*614*

Transport the change data capture log to a recipient system
702

Poll, by a separate transport engine server, the transaction table for committed transactions
704

Read, by the separate transport engine server, transaction identifiers for the committed transactions from the transaction table
706

Read, by the separate transport engine server, payload contents for the committed transactions from the change log contents table
708

Read, by the separate transport engine server, schema definitions the committed transactions from the schema table
710

Apply, by the separate transport engine server, the corresponding schemas to the payload contents to generate change-data capture items for transport
712

Provide the generated change-data capture items for transport via one or more transport mechanisms
714

*FIG. 7*

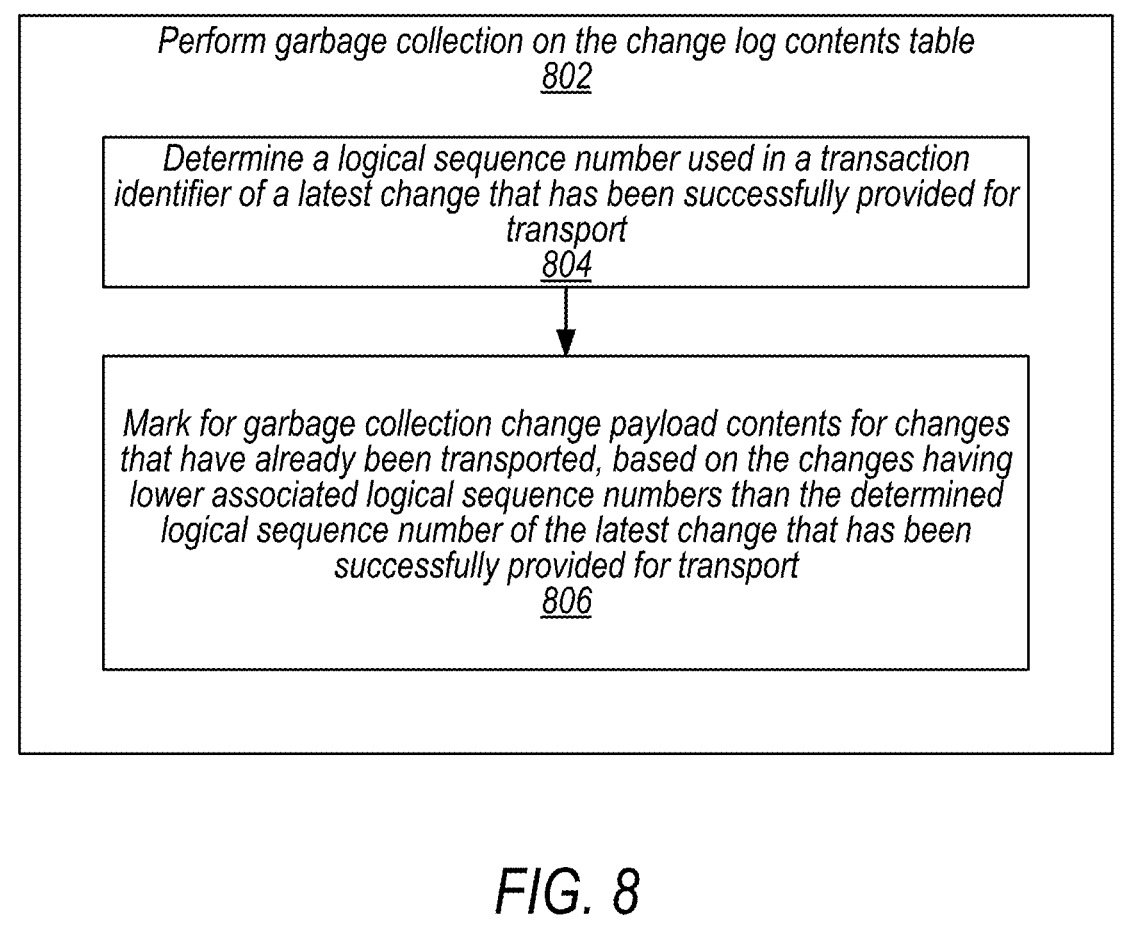

Perform garbage collection on the change log contents table
802

Determine a logical sequence number used in a transaction identifier of a latest change that has been successfully provided for transport
804

Mark for garbage collection change payload contents for changes that have already been transported, based on the changes having lower associated logical sequence numbers than the determined logical sequence number of the latest change that has been successfully provided for transport
806

*FIG. 8*

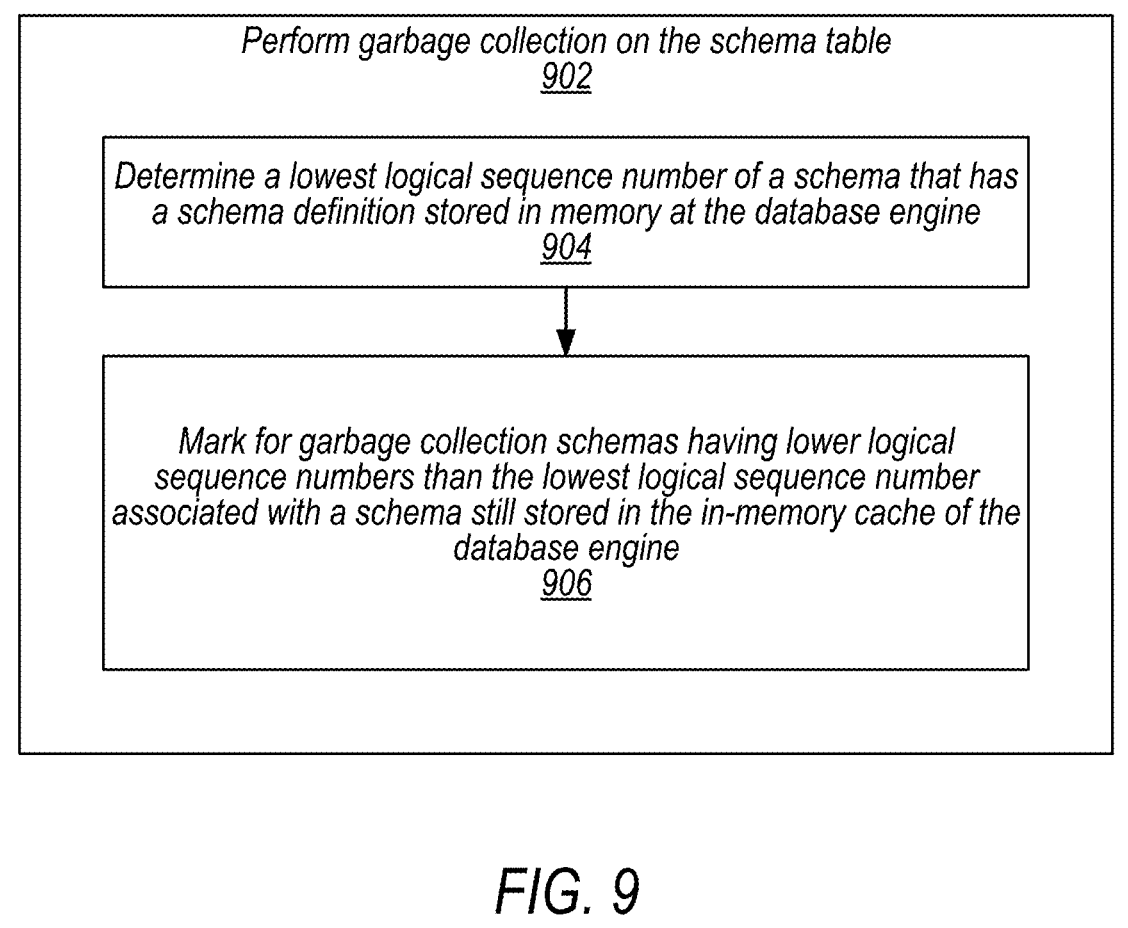

*Perform garbage collection on the schema table*
*902*

*Determine a lowest logical sequence number of a schema that has a schema definition stored in memory at the database engine*
*904*

*Mark for garbage collection schemas having lower logical sequence numbers than the lowest logical sequence number associated with a schema still stored in the in-memory cache of the database engine*
*906*

*FIG. 9*

OUT-OF-BAND SCHEMA TRACKING FOR CHANGE-DATA-CAPTURE LOGS

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the size and complexity of data storage and management technologies, like database systems, which in turn escalate the cost of maintaining the information.

New technologies more and more seek to reduce both the complexity and storage requirements of maintaining data while simultaneously improving the efficiency of data processing and querying. Challenges in obtaining the right configuration of data storage, processing, and querying, such that these database systems may be efficiently configured to perform various functions for different workloads occurs frequently.

BRIEF DESCRIPTION OF THE DRAWINGS

FIG. 7 is a flow diagram illustrating a process of transporting a change-data-capture log via change-data-capture items that are generated by stitching together separately stored schema information with payload contents for changes that have been written to the change-data-capture log, according to some embodiments.

FIG. 8 is a flow diagram illustrating a process for performing garbage collection for payload contents stored to a change log contents table of a change-data-capture log, according to some embodiments.

FIG. 9 is a flow diagram illustrating a process for performing garbage collection for schemas stored in a schema table of a change-data-capture log, according to some embodiments.

Figure 1:
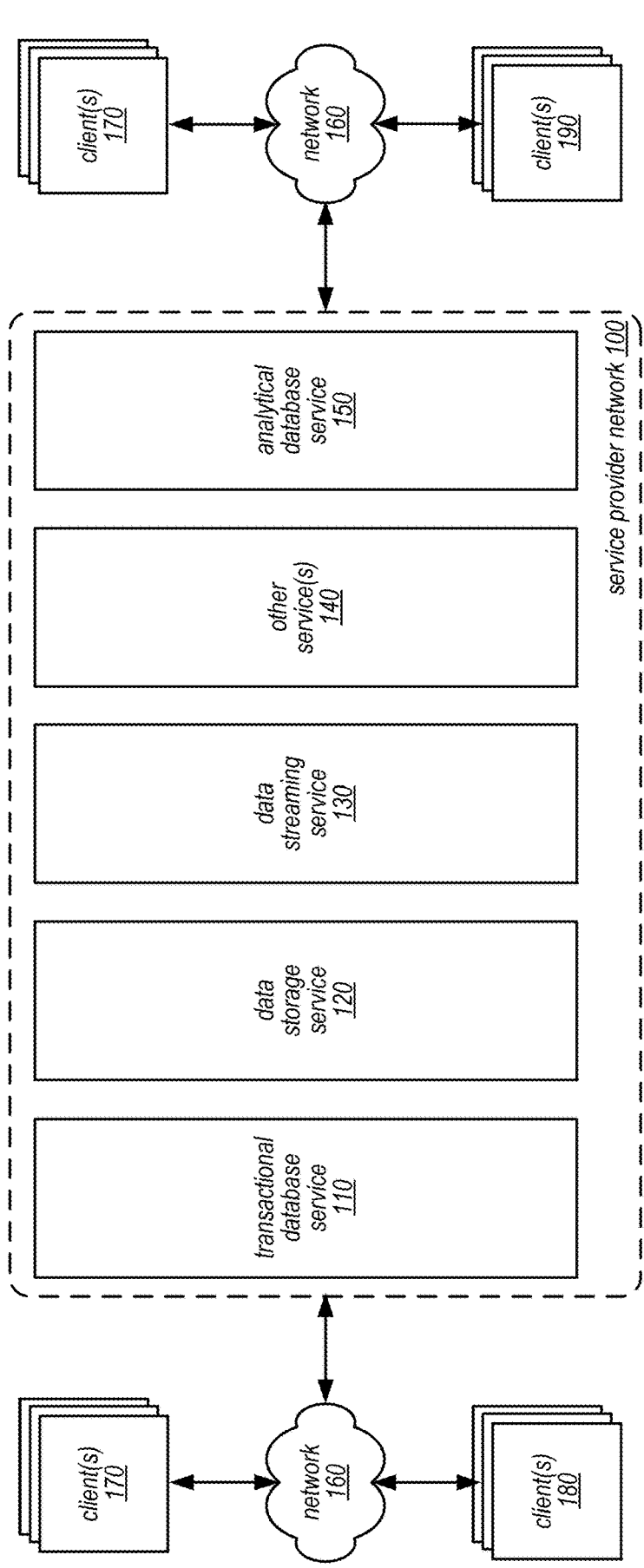
FIG. 1 illustrates a service provider network that includes a transactional database service and an analytical database service, as well as a data storage service and a data streaming service. In some situations, clients of the service provider network may both maintain transactional data in the transactional database and run analytical queries against the transactional data, for exampling using the analytical database or another analytical tool that receives change-data-capture items transported from the transactional database in near real-time as changes are made to the transactional database, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques pertaining to out-of-band schema tracking for change-data-capture logs as well as use of such change data-capture logs to maintain a hybrid transactional and analytical processing (HTAP) service are described. In some embodiments, a hybrid transactional and analytical processing system, which may implement at least a transactional database and an analytical database, may be used to maintain tables of transactional data at the transactional database, and maintain replicas of said tables at the analytical database. Such a hybrid transactional and analytical processing service may be optimized for both online transaction processing (OLTP) and online analytical processing (OLAP) related services, according to some embodiments. In order to maintain the replicas, or representations, of the transactional tables at the analytical database, a change-data-capture log of transactional changes made to the tables at the transactional database may be provided to the analytical database and incrementally applied and committed to the representations.

Running analytical queries against a transactional data store of the transactional database may impact the performance of the transactional queries, impact the performance of the computing resources of the transactional database, and, in some cases which may require leveraging materialized views and/or special indices, lead to a complex and/or challenging organization of database resources. In addition, scaling the structure of the transactional data stores of the transactional database such that they may be configured to treat analytical queries may be costly. On the other hand, "offloading" transactional data to an analytical database that is more optimized for analytical queries and analytical query management may be difficult to manage manually and/or lead to a lag (e.g., stale data). Techniques proposed herein, however, overcome these challenges by making use of the analytical database for running analytical queries against transactional data while minimizing the lag between the transactional data stored on the transactional database and the "offloaded" transactional data replications maintained on the analytical database, resulting in real-time analytics on data.

More specifically, some database formats, such as PostgreSQL, may be designed to provide a high insertion rate and may maintain schema information, in-memory, at a database engine. However, using the database engine to generate change-data-capture items (that include needed schema information) may be a sub-optimal use of computing capacity of the database engine (that could otherwise be used to maintain a high insertion rate for incoming transactions). Thus, it is desirable to offload the generation of change-data-capture items to an out-of-band computing resource, such as a virtual machine implemented for the purpose of transporting change-data-capture items from the transaction database to a recipient system, such as an analytical database, streaming service, storage service, etc. Though, because schema information is maintained in-memory in the database engine, such an out-of-band transport mechanism does not natively have access to the schema information. However, in some embodiments, a change-data-capture log written by a database engine further tracks and stores the needed schema information. In order to minimize computational load on the database engine (and also to minimize added storage overhead) the database engine only writes a full schema definition once to a schema table included in the change-data-capture log, and subsequently marks changes using an identifier for a schema (already stored in the schema table) that is applicable to the given change. In such embodiments, each schema stored in-memory at the database engine also has a corresponding schema definition stored in the schema table of the change-data-capture log. Thus, when subsequent changes are processed by the database engine, it can simply add a schema identifier to the payload contents of the change that is stored in a change log contents table, wherein the identifier points to a schema definition stored in the schema table of the change-data-capture log. This approach reduces the write burden on the database engine, because it only has to write the schema identifier, and not the full schema definition for each change (e.g. transaction). This approach also reduces storage bloat in the change-data-capture log, because schema definitions can be repeatedly referenced as opposed to being written in full for each change (e.g. transaction).

This specification continues with a general description of a service provider network that implements a hybrid transactional and analytical processing service, including a transactional database service and an analytical database service, that is configured to maintain transactional data, allow for querying against the transactional data, and support multi-version concurrency control (MVCC). Then, various examples of the hybrid transactional and analytical processing service, including different components/modules, or arrangements of components/module that may be employed as part of implementing the services are discussed. A number of different methods and techniques to maintain a representation in the analytical database service of a transactional table of the transactional database service are then discussed, some of which are illustrated in accompanying flowcharts. Finally, a description of an example computing system upon which the various components, modules, systems, devices, and/or nodes may be implemented is provided. Various examples are provided throughout the specification.

FIG. 1 illustrates a service provider network that includes a transactional database service and an analytical database service, as well as a data storage service and a data streaming service. In some situations, clients of the service provider network may both maintain transactional data in the transactional database and run analytical queries against the transactional data, for exampling using the analytical database or another analytical tool that receives change-data-capture items transported from the transactional database in near real-time as changes are made to the transactional database, according to some embodiments.

In some embodiments, a hybrid transactional and analytical processing service may be implemented within a service provider network, such as service provider network 100. In some embodiments, service provider network 100 may implement various computing resources or services, such as database service(s), (e.g., relational database services, non-relational database services, a map reduce service, a data warehouse service, data storage services, such as data storage service 120 (e.g., object storage services or block-based storage services that may implement a centralized data store for various types of data), and/or any other type of network based services (which may include a virtual compute service and various other types of storage, processing, analysis, communication, event handling, visualization, and security services not illustrated).

In some embodiments, a transactional database service, such as transactional database service 110, may be configured to store and maintain tables of transactional data items for client(s) of the transactional database service. For some clients of the transactional database service, further optimization of both transactional data processing and query processing against said transactional data may be made if tables of transactional data items are replicated and maintained in an analytical database service, such as analytical database service 150. In such a manner, processing and/or computing resources of the transactional database service may remain focused on processing transactional data without interference from potentially compute-intensive analytical query processing. By "outsourcing" such analytical query requests to an analytical database service, clients of the transactional database service may obtain near real-time analytical query results from the replicated tables in the analytical database service without limiting or taking away the computing resources of the transactional database service from transactional data processing.

In order to provide both initial replicas (e.g., snapshots) of the tables of the transactional database to the analytical database service and to provide subsequent updates (e.g. change-data-capture items) that should be applied to the tables in order to maintain the tables as up-to-date representations at a recipient system, such as the analytical database service, one or more additional services of service provider network 100 may be used as transport mechanisms. For example, a data storage service, such as data storage service 120, may be used to provide access to such change-data-capture items for the analytical database system. In addition to (or instead of) the data storage service, a data streaming service, such as data streaming service 130 may be used to stream the change-data-capture items to the analytical database system. A person having ordinary skill in the art should understand that additional embodiments using other transport mechanisms may similarly result in the transport of change-data-capture items from the transactional database to a recipient system, such as the analytical database, and may include the use of other service(s) 140 of service provider network 100.

As shown in the figure, multiple access points (e.g., client endpoints) may be used such that clients may access the different services of service provider network 100 more directly. For example, a client of clients 170 may have accounts with at least transactional database service 110 and analytical database service 150, and may be able to access these services of service provider network 110 through network 160. In some embodiments, a same or different network connection may be used at these different access points. Network 160 may represent the same network connection or multiple different network connections, according to some embodiments. For example, network 160 may generally encompass the various telecommunications networks and service providers that collectively implement the Internet. Network 160 may also include private networks such as local area networks (LANs) or wide area networks (WANs) as well as public or private wireless networks. For example, both a given client of clients 170 and/or 180 and the various network-based services of service provider network 100 may be respectively provisioned within enterprises having their own internal networks. In such an embodiment, network 160 may include the hardware (e.g., modems, routers, switches, load balancers, proxy servers, etc.) and software (e.g., protocol stacks, accounting software, firewall/security software, etc.) necessary to establish a networking link between the given client and the Internet as well as between the Internet and the various network-based services of service provider network 100. It is noted that in some embodiments, clients 170 and/or 180 may communicate with services of service provider network 100 using a private network rather than the public Internet. For example, clients 170, 180, and/or 190 may be provisioned within the same enterprise as various services of service provider network 100. In such a case, clients 170, 180, and/or 190 may communicate with the various services of service provider network 100 entirely through a private network 160 (e.g., a LAN or WAN that may use Internet-based communication protocols but which is not publicly accessible).

The systems described herein may, in some embodiments, implement a network-based service that enables clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system. In some embodiments, the database may be a PostgreSQL database.

Figure 2:
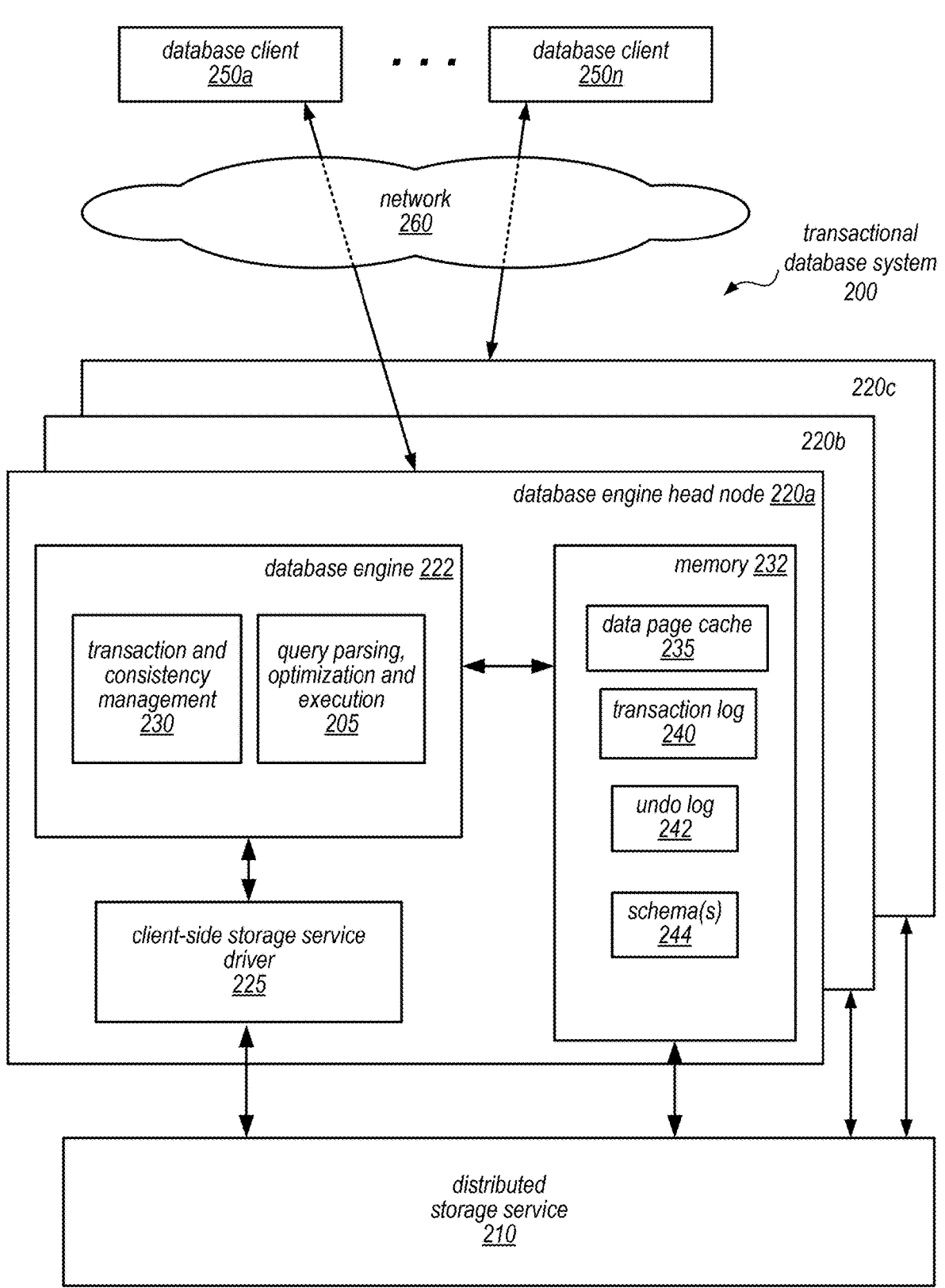
FIG. 2 illustrates various components of a transactional database system that includes a database engine and a separate distributed storage service, according to some embodiments.

FIG. 2 illustrates various components of a transactional database system that includes a database engine and a separate distributed storage service, according to some embodiments.

In some embodiments, transactional database system 200 described herein may, in some embodiments, implement a service-oriented architecture in which various functional components of the database system are intrinsically distributed. For example, transactional database system 200 may be organized such that the basic operations of a database (e.g., query processing, transaction management, caching and storage) are managed in tiers that may be individually and independently scalable. For example, in some embodiments, transactional database system 200 may include a database tier (which may include a single database engine head node and a client-side storage system driver), and a separate, distributed storage system (which may include multiple storage nodes that collectively perform some of the operations traditionally performed in the database tier of existing systems).

As described in more detail herein, in some embodiments, some of the lowest level operations of a database (e.g., backup, restore, snapshot, recovery, log record manipulation, and/or various space management operations) may be offloaded from the database engine to the storage layer (or tier), such as a distributed storage system, and distributed across multiple nodes and storage devices. For example, in some embodiments, rather than the database engine applying changes to a database (or data pages thereof) and then sending the modified data pages to the storage layer, the application of changes to the stored database (and data pages thereof) may be the responsibility of the storage layer itself. In such embodiments, redo log records, rather than modified data pages, may be sent to the storage layer, after which redo processing (e.g., the application of the redo log records) may be performed in a distributed manner (e.g., by a background process). Log sequence numbers may be assigned to the redo log records from a log sequence number space. In some embodiments, crash recovery (e.g., the rebuilding of data pages from stored redo log records) may also be performed by the storage layer and may also be performed by a distributed background process.

In some embodiments, because redo logs (and not modified data pages) are sent to the storage layer, there may be much less network traffic between the database tier and the storage layer than in existing database systems. In some embodiments, each redo log may be on the order of one-tenth the size of the corresponding data page for which it specifies a change. Note that requests sent from the database tier and the distributed storage system may be asynchronous and that multiple such requests may be in flight at a time. In addition to redo logs, as further described herein, a change-data-capture log may similarly be sent to the storage layer, and a transport engine may generate change data-capture items for transport using change payload contents stored to a change log table of the change-data-capture log, as well as using a transaction table and schema table of the change-data-capture log.

In general, after being given a piece of data, a primary requirement of a database is that it can eventually give that piece of data back. To do this, the database may include several different components (or tiers), each of which performs a different function. For example, a traditional database may be thought of as having three tiers: a first tier for performing query parsing, optimization and execution; a second tier for providing transactionality, recovery, and durability; and a third tier that provides storage, either on locally attached disks or on network-attached storage. As noted above, previous attempts to scale a traditional database have typically involved replicating all three tiers of the database and distributing those replicated database instances across multiple machines.

In some embodiments, the transactional database system described herein may partition functionality of a database system differently than in a traditional database, and may distribute only a subset of the functional components (rather than a complete database instance) across multiple machines in order to implement scaling. For example, in some embodiments, a client-facing tier may be configured to receive a request specifying what data is to be stored or retrieved, but not how to store or retrieve the data. This tier may perform request parsing and/or optimization (e.g., SQL parsing and optimization), while another tier may be responsible for query execution. In some embodiments, a third tier may be responsible for providing transactionality and consistency of results. For example, this tier may be configured to enforce some of the so-called ACID properties, in particular, the Atomicity of transactions that target the database, maintaining Consistency within the database, and ensuring Isolation between the transactions that target the database. In some embodiments, a fourth tier may then be responsible for providing Durability of the stored data in the presence of various sorts of faults. For example, this tier may be responsible for change logging, recovery from a database crash, managing access to the underlying storage volumes and/or space management in the underlying storage volumes.

In various embodiments, a database instance may include multiple functional components (or layers), each of which provides a portion of the functionality of the database instance. In one such example, a database instance may include a query parsing and query optimization layer, a query execution layer, a transactionality and consistency management layer, and a durability and space management layer. As noted above, in some existing database systems, scaling a database instance may involve duplicating the entire database instance one or more times (including all of the example layers), and then adding glue logic to stitch them together. In some embodiments, the systems described herein may instead offload the functionality of durability and space management layer from the database tier to a separate storage layer, and may distribute that functionality across multiple storage nodes in the storage layer.

In some embodiments, the transactional database systems described herein may retain much of the structure of the upper half of the database instance, such as query parsing and query optimization layer, a query execution layer, and a transactionality and consistency management layer, but may redistribute responsibility for at least portions of the backup, restore, snapshot, recovery, and/or various space management operations to the storage tier. Redistributing functionality in this manner and tightly coupling log processing between the database tier and the storage tier may improve performance, increase availability and reduce costs, when compared to previous approaches to providing a scalable database. For example, network and input/output bandwidth requirements may be reduced, since only redo log records and change-data-capture log records (which are much smaller in size than the actual data pages) may be shipped across nodes or persisted within the latency path of write operations. In addition, the generation of data pages can be done independently in the background on each storage node (as foreground processing allows), without blocking incoming write operations. In some embodiments, the use of log-structured, non-overwrite storage may allow backup, restore, snapshots, point-in-time recovery, and volume growth operations to be performed more efficiently, e.g., by using metadata manipulation rather than movement or copying of a data page. In some embodiments, the storage layer may also assume the responsibility for the replication of data stored on behalf of clients (and/or metadata associated with that data, such as redo log records and change-data-capture log records) across multiple storage nodes. For example, data (and/or metadata) may be replicated locally (e.g., within a single "availability zone" in which a collection of storage nodes executes on its own physically distinct, independent infrastructure) and/or across availability zones in a single region or in different regions.

In various embodiments, the database systems described herein may support a standard or custom application programming interface (API) for a variety of database operations. For example, the API may support operations for creating a database, creating a table, altering a table, creating a user, dropping a user, inserting one or more rows in a table, copying values, selecting data from within a table (e.g., querying a table), canceling or aborting a query, creating a snapshot, and/or other operations.

In some embodiments, the database tier of a database instance may include a database engine head node server that receives read and/or write requests from various client programs (e.g., applications) and/or subscribers (users), then parses them and develops an execution plan to carry out the associated database operation(s). For example, the database engine head node may develop the series of steps necessary to obtain results for complex queries and joins. In some embodiments, the database engine head node may manage communications between the database tier of the database system and clients/subscribers, as well as communications between the database tier and a separate distributed storage system.

In some embodiments, the database engine head node may be responsible for receiving SQL requests from end clients through a JDBC or ODBC interface and for performing SQL processing and transaction management (which may include locking) locally. However, rather than generating data pages locally, the database engine head node (or various components thereof) may generate redo log records and may ship them to the appropriate nodes of a separate distributed storage system. In some embodiments, a client-side driver for the distributed storage system may be hosted on the database engine head node and may be responsible for routing redo log records to the storage system node (or nodes) that store the segments (or data pages thereof) to which those redo log records are directed. For example, in some embodiments, each segment may be mirrored (or otherwise made durable) on multiple storage system nodes that form a protection group. In such embodiments, the client-side driver may keep track of the nodes on which each segment is stored and may route redo logs to all of the nodes on which a segment is stored (e.g., asynchronously and in parallel, at substantially the same time), when a client request is received. As soon as the client-side driver receives an acknowledgement back from a write quorum of the storage nodes in the protection group (which may indicate that the redo log record has been written to the storage node), it may send an acknowledgement of the requested change to the database tier (e.g., to the database engine head node). For example, in embodiments in which data is made durable through the use of protection groups, the database engine head node may not be able to commit a transaction until and unless the client-side driver receives a reply from enough storage node instances to constitute a write quorum, as may be defined in a protection group policy for the data.

In some embodiments, additional protection groups may be used to store change-data-capture information. For example, a transaction table may be stored in a transaction protection group, one or more change log contents tables may be stored in a separate change log protection group, and a schema table may be stored in a schema protection group. In some embodiments, the schema information is stored separately (e.g. not in line with the contents of a given change). This allows for more compact storage of changes, because changes affecting the same schema can reference a single stored schema definition for the schema, instead of writing the full schema definition repeatedly for each change involving that schema.

In some embodiments, the database tier (or more specifically, the database engine head node) may include a cache in which recently accessed data pages are held temporarily. Also, all schemas currently active for the portion of the database maintained by the database engine head node may be stored locally in the node's cache. In such embodiments, if a write request is received that targets a data page held in such a cache, in addition to shipping a corresponding redo log record to the storage layer and shipping change-data-capture information to the change-data-capture log, the database engine may apply the change to the copy of the data page held in its cache. However, unlike in other database systems, a data page held in this cache may not ever be flushed to the storage layer, and it may be discarded at any time (e.g., at any time after the redo log record for a write request that was most recently applied to the cached copy has been sent to the storage layer and acknowledged). The cache may implement any of various locking mechanisms to control access to the cache by at most one writer (or multiple readers) at a time, in different embodiments. Note, however, that in embodiments that include such a cache, the cache may not be distributed across multiple nodes, but may exist only on the database engine head node for a given database instance. Therefore, there may be no cache coherency or consistency issues to manage.

In some embodiments, the client-side driver running on the database engine head node may expose a private interface to the storage tier. In some embodiments, it may also expose a traditional iSCSI interface to one or more other components (e.g., other database engines or virtual computing services components). In some embodiments, storage for a database instance in the storage tier may be modeled as a single volume that can grow in size without limits, and that can have an unlimited number of IOPS associated with it. When a volume is created, it may be created with a specific size, with a specific availability/durability characteristic (e.g., specifying how it is replicated), with an IOPS rate associated with it (e.g., both peak and sustained), and/or user specified encryption. For example, in some embodiments, a variety of different durability models may be supported, and users/subscribers may be able to specify, for their database, a number of replication copies, zones, or regions and/or whether replication is synchronous or asynchronous based upon their durability, performance and cost objectives.

In some embodiments, the client side driver may maintain metadata about the volume and may directly send asynchronous requests to each of the storage nodes necessary to fulfill read requests and write requests without requiring additional hops between storage nodes. The volume metadata may indicate which protection groups, and their respective storage nodes, maintain which partitions of the volume. For example, in some embodiments, in response to a request to make a change to a database, the client-side driver may be configured to determine the protection group, and its one or more nodes that are implementing the storage for the targeted data page, and to route the redo log record(s) specifying that change to those storage nodes. These read and write requests or separate synchronization requests may also include encrypted data which includes keys to decrypt data store of the protection group to which the storage node belongs. The storage nodes may then be responsible for applying the change specified in the redo log record to the targeted data page at some point in the future, including decrypting the received keys and using the received keys to decrypt stored data to apply the change specified in the redo log record. As writes are acknowledged back to the client-side driver, the client-side driver may advance the point at which the volume is durable and may acknowledge commits back to the database tier. As previously noted, in some embodiments, the client-side driver may not ever send data pages to the storage node servers. This may not only reduce network traffic, but may also remove the need for the checkpoint or background writer threads that constrain foreground-processing throughput in previous database systems.

In some embodiments, because accesses to the log-structured data storage for the redo log records may consist of a series of sequential input/output operations (rather than random input/output operations), the changes being made may be tightly packed together. It should also be noted that, in contrast to existing systems in which each change to a data page results in two input/output operations to persistent data storage (one for the redo log and one for the modified data page itself), in some embodiments, the systems described herein may avoid this "write amplification" by coalescing data pages at the storage nodes of the distributed storage system based on receipt of the redo log records. Coalesce operations performed upon data pages may utilize received keys to access encrypted data pages and redo log records at the storage nodes.

As previously noted, in some embodiments, the storage tier of the transactional database system may be responsible for taking database snapshots. However, because the storage tier implements log-structured storage, taking a snapshot of a data page (e.g., a data block) may include recording a timestamp associated with the redo log record that was most recently applied to the data page/block (or a timestamp associated with the most recent operation to coalesce multiple redo log records to create a new version of the data page/block), and preventing garbage collection of the previous version of the page/block and any subsequent log entries up to the recorded point in time. In such embodiments, taking a database snapshot may not require reading, copying, or writing the data block, as would be required when employing an off-volume backup strategy. In some embodiments, the space requirements for snapshots may be minimal, since only modified data would require additional space, although user/subscribers may be able to choose how much additional space they want to keep for on-volume snapshots in addition to the active data set. In different embodiments, snapshots may be discrete (e.g., each snapshot may provide access to all of the data in a data page as of a specific point in time) or continuous (e.g., each snapshot may provide access to all versions of the data that existing in a data page between two points in time). In some embodiments, reverting to a prior snapshot may include recording a log record to indicate that all redo log records and data pages since that snapshot are invalid and garbage collectable, and discarding all database cache entries after the snapshot point. In such embodiments, no roll-forward may be required since the storage system will, on a block-by-block basis, apply redo log records to data blocks as requested and in the background across all nodes, just as it does in normal forward read/write processing, which again may utilize a received encryption keys. Crash recovery may thereby be made parallel and distributed across nodes.

One embodiment of a service system architecture that may be configured to implement a network-based services-based transactional database service is illustrated in FIG. 2. In the illustrated embodiment, a number of clients (shown as clients 250a-250n) may be configured to interact with transactional database system 200 via a network 260. Distributed storage service 210 may be implemented as log-structured storage using a single log sequence number space. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to a network-based services platform via network 260, including requests for database services. For example, a given client 250 may include a suitable version of a web browser, or may include a plug-in module or other type of code module configured to execute as an extension to or within an execution environment provided by a web browser. Alternatively, a client 250 (e.g., a database service clients 250a through 250n) may encompass an application such as a database application (or user interface thereof), a media application, an office application or any other application that may make use of persistent storage resources to store and/or access one or more databases. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with the network-based services of service provider network 100. In some embodiments, client 250 may be configured to generate network-based services requests according to a Representational State Transfer (REST)-style network-based services architecture, a document- or message-based network-based services architecture, or another suitable network-based services architecture.

In some embodiments, a client 250 (e.g., a database service client) may be configured to provide access to network-based services-based storage of databases to other applications in a manner that is transparent to those applications. For example, client 250 may be configured to integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model. Instead, the details of interfacing to network-based services of service provider network 100 may be coordinated by client 250 and the operating system or file system on behalf of applications executing within the operating system environment. Clients 250 may convey network-based services requests (e.g., read/restore data requests, etc.) to and receive responses from service provider network 100 via network 260. In various embodiments, network 260 may encompass any suitable combination of networking hardware and protocols necessary to establish network-based-based communications between clients 250 and transactional database system 200 of transactional database service 110.

Figure 3:
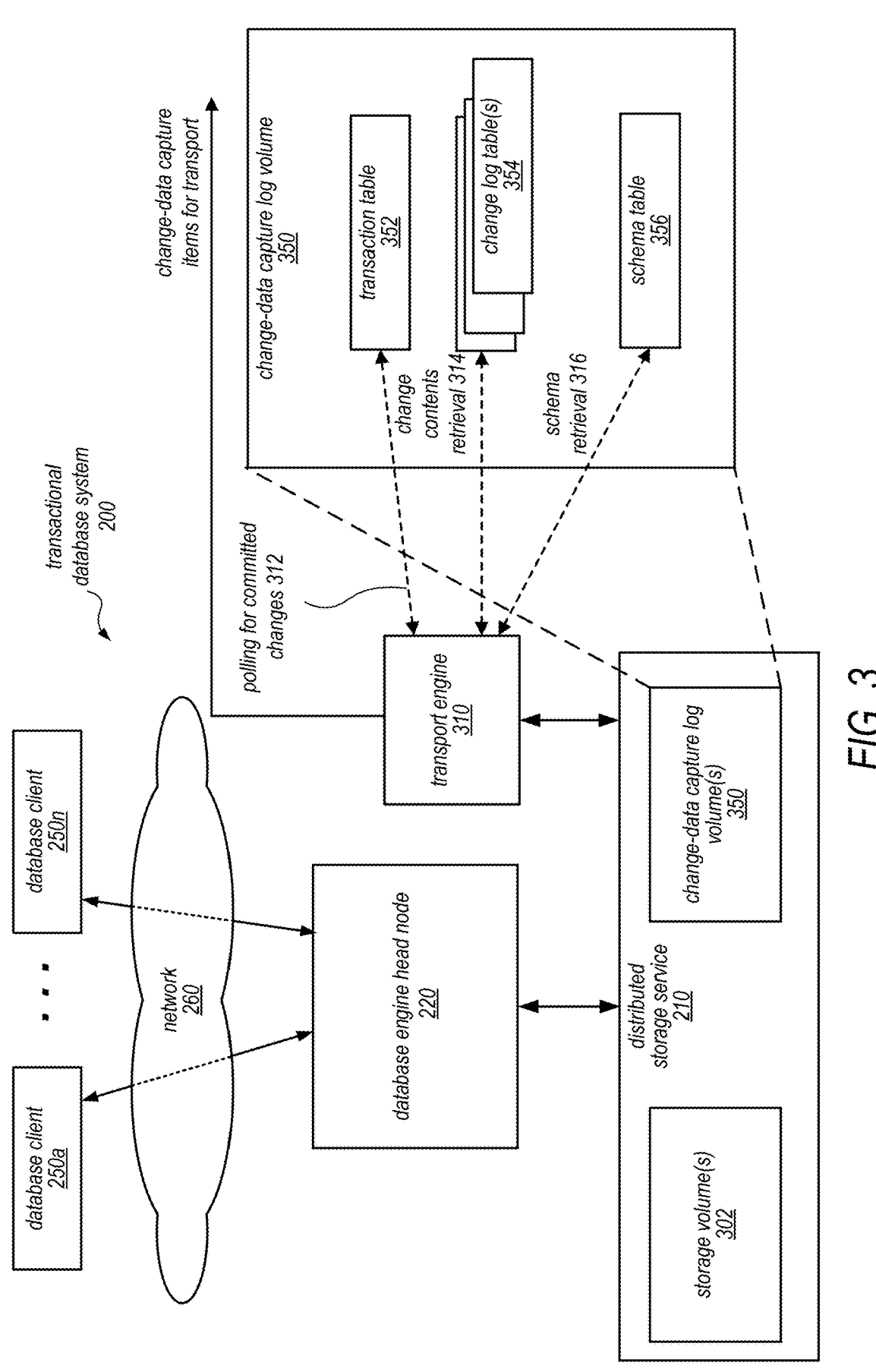
FIG. 3 illustrates example contents of a change-data-capture log and a transport engine that transports change-data-capture items from the transactional database based on information stored to the change-data-capture log by a database engine used to implement the transactional database, wherein the transport engine stitches together schema information that is stored separately from payload contents in order to generate the change-data-capture items for transport, according to some embodiments.
Figure 4:
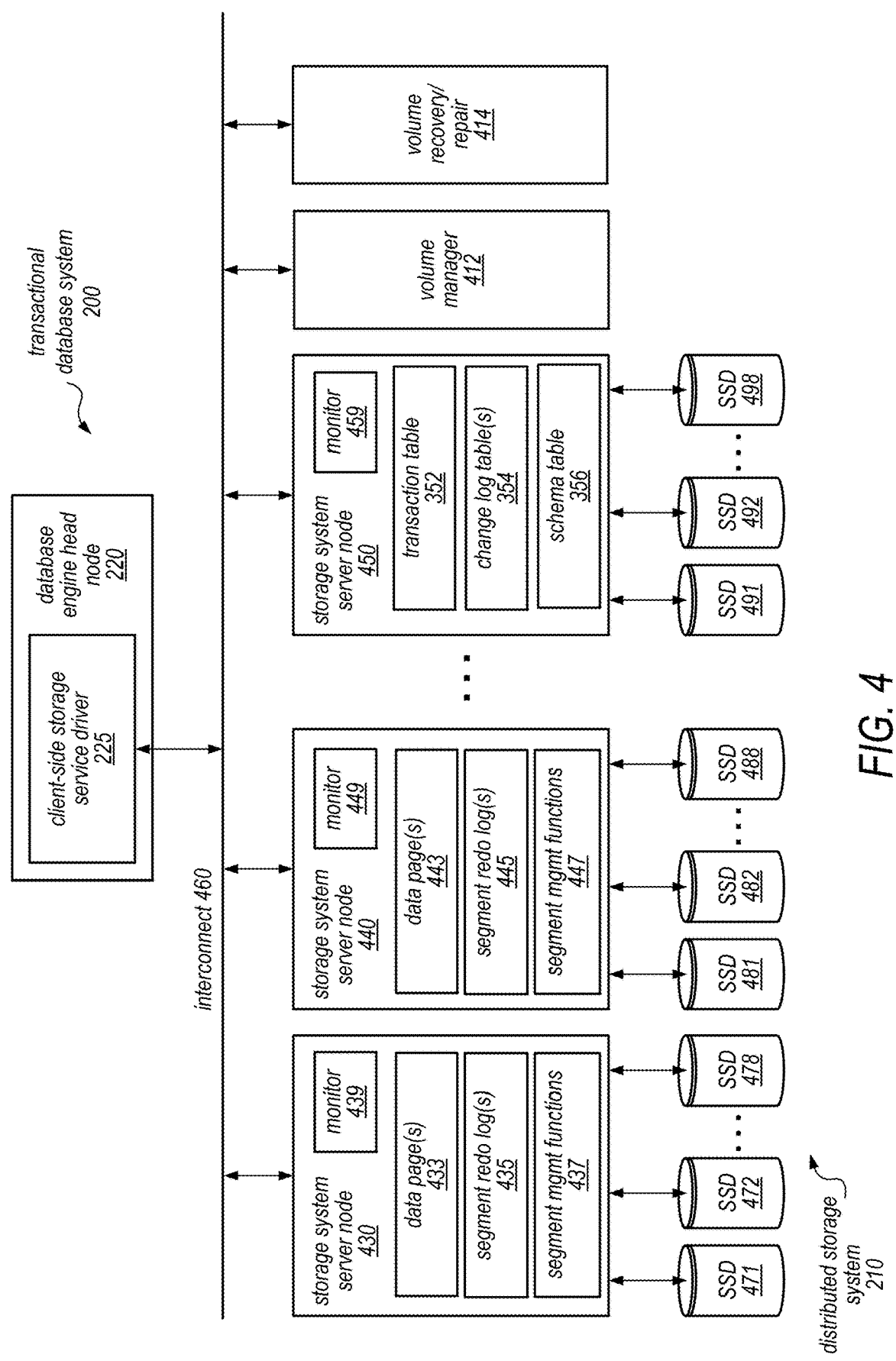
FIG. 4 illustrates a distributed storage system used by a transactional database system to store data pages, redo logs, etc. and to also store change-data-capture log information used to transport change-data-capture items, according to some embodiments.

Generally speaking, transactional database service 110 may be configured to implement one or more service endpoints for clients of service provider network 100 which may be configured to receive and process network-based services requests, such as requests to access data pages (or records thereof). For example, transactional database service 110 may include hardware and/or software configured to implement a particular endpoint, such that an HTTP-based network-based services request directed to that endpoint is properly received and processed. In some embodiments, transactional database service 110 may be implemented as a server system configured to receive network-based services requests from clients 250 and to forward them to components of transactional database system 200. In other embodiments, transactional database service 110 may be configured as a number of distinct systems (e.g., in a distributed topology, such as shown in FIGS. 2, 3 and 4 for transactional database system 200) implementing load balancing and other request management features configured to dynamically manage large-scale network-based services request processing loads. In various embodiments, transactional database service 110 may be configured to support REST-style or document-based (e.g., SOAP-based) types of network-based services requests.

In addition to functioning as an addressable endpoint for clients' network-based services requests, in some embodiments, transactional database service 110 may implement various client management features. For example, transactional database service 110 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Transactional database service 110 may also implement financial accounting and billing systems, or may maintain a database of usage data that may be queried and processed by external systems for reporting and billing of client usage activity. In certain embodiments, transactional database service 110 may be configured to collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of transactional database service 110.

In some embodiments, transactional database service 110 may also implement user authentication and access control procedures. For example, for a given network-based services request to access a particular database, transactional database service 110 may be configured to ascertain whether the client 250 associated with the request is authorized to access the particular database. Transactional database service 110 may determine such authorization by, for example, evaluating an identity, password or other credential against credentials associated with the particular database, or evaluating the requested access to the particular database against an access control list for the particular database. For example, if a client 250 does not have sufficient credentials to access the particular database, transactional database service 110 may reject the corresponding network-based services request, for example by returning a response to the requesting client 250 indicating an error condition. Various access control policies may be stored as records or lists of access control information by transactional database service 110.

It is noted that while service provider network 100 may represent the primary interface through which clients 250 may access the features of transactional database system 200 that implements transactional database service 110, it need not represent the sole interface to such features. For example, an alternate API that may be distinct from a network-based services interface may be used to allow clients internal to the enterprise providing transactional database system 200 to bypass network-based services.

Although not illustrated, in various embodiments distributed storage service 210 may be configured to interface with backup data store, system, service, or device. Various data, such as data pages, log records, and/or any other data maintained by distributed storage service internal clients, such as transactional database service 110 or other virtual computing services, and/or external clients such as clients 250a through 250n, may be sent to a backup data store.

Note that in various embodiments, different storage policies may be implemented by transactional database service 110 and/or distributed storage service 210. Examples of such storage policies may include a durability policy (e.g., a policy indicating the number of instances of a database (or data page thereof) that will be stored and the number of different nodes on which they will be stored) and/or a load balancing policy (which may distribute databases, or data pages thereof, across different nodes, volumes and/or disks in an attempt to equalize request traffic). In addition, different storage policies may be applied to different types of stored items by various one of the services. For example, in some embodiments, distributed storage service 210 may implement a higher durability for redo log records than for data pages.

In some embodiments, such as shown in FIG. 2, transactional database system 200 includes a respective database engine head node 220 for each of several databases and a distributed storage service 210 (which may or may not be visible to the clients of the database system, shown as database clients 250a-250n). As illustrated in this example, one or more of database clients 250a-250n may access a database engine head node 220 (e.g., head node 220a, head node 220b, or head node 220c, each of which is a component of a respective database instance) via network 260 (e.g., these components may be network-addressable and accessible to the database clients 250a-250n). However, distributed storage service 210, which may be employed by transactional database system 200 to store a database volume (such as data pages of one or more databases, as well as redo log records and/or other metadata associated therewith) on behalf of database clients 250a-250n, and to perform other functions of transactional database system 200 as described herein, may or may not be network-addressable and accessible to the storage clients 250a-250n, in different embodiments. For example, in some embodiments, distributed storage service 210 may perform various storage, access, change logging, recovery, log record manipulation, and/or space management operations in a manner that is invisible to storage clients 250a-250n.

As previously noted, each database instance may include a single database engine head node 220 that receives requests from various client programs (e.g., applications) and/or subscribers (users), then parses them, optimizes them, and develops an execution plan to carry out the associated database operation(s). In the example illustrated in FIG. 2, a query parsing, optimization, and execution component 205 of database engine head node 220a may perform these functions for queries that are received from database client 250a and that target the database instance of which database engine head node 220a is a component. In some embodiments, query parsing, optimization, and execution component 205 may return query responses to database client 250a, which may include write acknowledgements, requested data pages (or portions thereof), error messages, and or other responses, as appropriate. As illustrated in this example, database engine head node 220a may also include a client-side storage service driver 225, which may route read requests and/or redo log records to various storage nodes within distributed storage service 210, receive write acknowledgements from distributed storage service 210, receive requested data pages from distributed storage service 210, and/or return data pages, error messages, or other responses to query parsing, optimization, and execution component 205 (which may, in turn, return them to database client 250a). Client-side storage service driver 225 may maintain mapping information about the database volume stored in distributed storage service 210, such that a particular protection group maintaining a partition of the database volume may be determined. Read requests and redo log records may then be routed to storage nodes that are members of the protection group according to the partition of user data to which the read request is directed or to which the redo log record pertains. Client-side storage service driver 225 may obtain encrypted keys for the different protection groups of a data volume from distributed storage service 210 and provide them to individual storage nodes of the respective protection groups so that the client-side storage service driver sends the key for each protection group to the storage nodes of the protection group when communicating with storage nodes of the protection group.

In this example, database engine head node 220a includes a data page cache 235, in which data pages that were recently accessed may be temporarily held. As illustrated in FIG. 2, database engine head node 220a may also include a transaction and consistency management component 230, which may be responsible for providing transactionality and consistency in the database instance of which database engine head node 220a is a component. For example, this component may be responsible for ensuring the Atomicity, Consistency, and Isolation properties of the database instance and the transactions that are directed that the database instance. As illustrated in FIG. 2, database engine head node 220a may also include a transaction log 240 and an undo log 245, which may be employed by transaction and consistency management component 230 to track the status of various transactions and roll back any locally cached results of transactions that do not commit. Additionally, schema definitions are stored in schema cache 244 and may be used to update data pages stored in the data page cache. For example, a schema may be used for a given change and the change may be logged in the transaction log.

Note that each of the other database engine head nodes 220 illustrated in FIG. 2 (e.g., 220b and 220c) may include similar components and may perform similar functions for queries received by one or more of database clients 250a-250n and directed to the respective database instances of which it is a component.

In some embodiments, the distributed storage system of distributed storage service 210 described herein (e.g., distributed storage system 310 shown in FIG. 4) may organize data in various logical data volumes, extents (which may include partitions of the user data space in the volume and a segmentation of the log for the volume as well as the change-data-capture log volume) made durable among a protection group of storage nodes, segments (which may be data stored on an individual storage node of a protection group) and pages for storage on one or more storage nodes. For example, in some embodiments, each database is represented by a logical volume, and each logical volume is partitioned over a collection of storage nodes into extents. In addition, another change-data-capture log volume may be maintained for each database may be used in exporting change-data-capture information for each database. A protection group may be composed of different storage nodes in the distributed storage service that together make an extent durable. Multiple segments, each of which lives on a particular one of the storage nodes in a protection group, are used to make the extent durable.

In some embodiments, each data page is stored in a segment, such that each segment stores a collection of one or more data pages and a change log (also referred to as a redo log) (e.g., a log of redo log records) for each data page that it stores. Thus, change logs may be log records segmented to the protection group of which the segment is a member. As described in detail herein, the storage nodes may be configured to receive redo log records (which may also be referred to herein as ULRs) and to coalesce them to create new versions of the corresponding data pages and/or additional or replacement log records (e.g., lazily and/or in response to a request for a data page or a database crash). If the data volume is encrypted, such a coalesce operation may need to obtain the encryption key to perform the coalesce operation. In some embodiments, data pages and/or change logs may be mirrored across multiple storage nodes, according to a variable configuration, such as in a protection group (which may be specified by the client on whose behalf the databases are being maintained in the database system). For example, in different embodiments, one, two, or three copies of the data or change logs may be stored in each of one, two, or three different availability zones or regions, according to a default configuration, an application-specific durability preference, or a client-specified durability preference.

As used herein, the following terms may be used to describe the organization of data by a distributed storage system such as distributed storage system 210, according to various embodiments.

Volume: A volume may be a logical concept representing a highly durable unit of storage that a user/client/application of the storage system understands. More specifically, a volume is a distributed store that appears to the user/client/application as a single consistent ordered log of write operations to various user pages of a database. Each write operation may be encoded in a User Log Record (ULR), which represents a logical, ordered mutation to the contents of a single user page within the volume. As noted above, a ULR may also be referred to herein as a redo log record. Each ULR may include a unique identifier (e.g., a Logical Sequence Number (LSN)) assigned from a log sequence number space. Each ULR may be persisted to one or more synchronous segments in the log-structured distributed store that form a Protection Group (PG) maintaining the partition of user data space (i.e. extent) to which the update indicate by the log record pertains in order to provide high durability and availability for the ULR. A volume may provide an LSN-type read/write interface for a variable-size contiguous range of bytes.

In some embodiments, a volume may consist of multiple extents, each made durable through a protection group. In such embodiments, a volume may represent a unit of storage composed of a mutable contiguous sequence of Volume Extents. Reads and writes that are directed to a volume may be mapped into corresponding reads and writes to the constituent volume extents. In some embodiments, the size of a volume may be changed by adding or removing volume extents from the end of the volume.

Segment: A segment may be a limited-durability unit of storage assigned to a single storage node. Multiple segments may be implemented in a protection group to persist an extent. More specifically, a segment provides limited best-effort durability (e.g., a persistent, but non-redundant single point of failure that is a storage node) for a specific fixed-size byte range of data. This data may in some cases be a mirror of user-addressable data, or it may be other data, such as volume metadata or erasure coded bits, in various embodiments. A given segment may live on exactly one storage node. Within a storage node, multiple segments may live on each SSD, and each segment may be restricted to one SSD (e.g., a segment may not span across multiple SSDs). In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes. In some embodiments, a segment may provide an LSN-type read/write interface for a fixed-size contiguous range of bytes (where the size is defined at creation). In some embodiments, each segment may be identified by a Segment UUID (e.g., a universally unique identifier of the segment).

Storage page: A storage page may be a block of memory, generally of fixed size. In some embodiments, each page is a block of memory (e.g., of virtual memory, disk, or other physical memory) of a size defined by the operating system, and may also be referred to herein by the term "data block". More specifically, a storage page may be a set of contiguous sectors. It may serve as the unit of allocation in SSDs, as well as the unit in log pages for which there is a header and metadata. In some embodiments, and in the context of the database systems described herein, the term "page" or "storage page" may refer to a similar block of a size defined by the database configuration, which may typically a multiple of 2, such as 4096, 8192, 16384, or 32768 bytes.

Log page: A log page may be a type of storage page that is used to store log records (e.g., redo log records or undo log records). In some embodiments, log pages may be identical in size to storage pages. Each log page may include a header containing metadata about that log page, e.g., metadata identifying the segment to which it belongs. Note that a log page is a unit of organization and may not necessarily be the unit of data included in write operations. For example, in some embodiments, during normal forward processing, write operations may write to the tail of the log one sector at a time.

Log Records: Log records (e.g., the individual elements of a log page) may be of several different classes. For example, User Log Records (ULRs), which are created and understood by users/clients/applications of the storage system, may be used to indicate changes to user data in a volume. Log records may include metadata, such as pointers or back links, that indicate a previous LSN for log record maintained at a particular segment and/or the previous LSN in the log sequence number space. Control Log Records (CLRs), which are generated by the storage system, may also contain control information used to keep track of metadata such as the current unconditional volume durable LSN (VDL). Null Log Records (NLRs) may in some embodiments be used as padding to fill in unused space in a log sector or log page. In some embodiments, there may be various types of log records within each of these classes, and the type of a log record may correspond to a function that needs to be invoked to interpret the log record. For example, one type may represent all the data of a user page in compressed format using a specific compression format; a second type may represent new values for a byte range within a user page; a third type may represent an increment operation to a sequence of bytes interpreted as an integer; and a fourth type may represent copying one byte range to another location within the page. In some embodiments, log record types may be identified by GUIDs (rather than by integers or enums), which may simplify versioning and development, especially for ULRs.

Payload: The payload of a log record may be the data or parameter values that are specific to the log record or to log records of a particular type. For example, in some embodiments, there may be a set of parameters or attributes that most (or all) log records include, and that the storage system itself understands. These attributes may be part of a common log record header/structure, which may be relatively small compared to the sector size. In addition, most log records may include additional parameters or data specific to that log record type, and this additional information may be considered the payload of that log record. In some embodiments, if the payload for a particular ULR is larger than the user page size, it may be replaced by an absolute ULR (an AULR) whose payload includes all the data for the user page. This may enable the storage system to enforce an upper limit on the size of the payload for ULRs that is equal to the size of user pages.

Note that when storing log records in the segment log, the payload may be stored along with the log header, in some embodiments. In other embodiments, the payload may be stored in a separate location, and pointers to the location at which that payload is stored may be stored with the log header. In still other embodiments, a portion of the payload may be stored in the header, and the remainder of the payload may be stored in a separate location. If the entire payload is stored with the log header, this may be referred to as in-band storage; otherwise the storage may be referred to as being out-of-band. In some embodiments, the payloads of most large AULRs may be stored out-of-band in the cold zone of log (which is described below).

User pages: User pages may be the byte ranges (of a fixed size) and alignments thereof for a particular volume that are visible to users/clients of the storage system. User pages are a logical concept, and the bytes in particular user pages may or not be stored in any storage page as-is. The size of the user pages for a particular volume may be independent of the storage page size for that volume. In some embodiments, the user page size may be configurable per volume, and different segments on a storage node may have different user page sizes. In some embodiments, user page sizes may be constrained to be a multiple of the sector size (e.g., 4 KB), and may have an upper limit (e.g., 64 KB). The storage page size, on the other hand, may be fixed for an entire storage node and may not change unless there is a change to the underlying hardware.

Data page: A data page may be a type of storage page that is used to store user page data in compressed form. In some embodiments every piece of data stored in a data page is associated with a log record, and each log record may include a pointer to a sector within a data page (also referred to as a data sector). In some embodiments, data pages may not include any embedded metadata other than that provided by each sector. There may be no relationship between the sectors in a data page. Instead, the organization into pages may exist only as an expression of the granularity of the allocation of data to a segment.

Storage node: A storage node may be a single virtual machine that on which storage node server code is deployed. Each storage node may contain multiple locally attached SSDs, and may provide a network API for access to one or more segments. In some embodiments, various nodes may be on an active list or on a degraded list (e.g., if they are slow to respond or are otherwise impaired, but are not completely unusable). In some embodiments, the client-side driver may assist in (or be responsible for) classifying nodes as active or degraded, for determining if and when they should be replaced, and/or for determining when and how to redistribute data among various nodes, based on observed performance. Multiple storage nodes may together implement a protection group, in some embodiments.

SSD: As referred to herein, the term "SSD" may refer to a local block storage volume as seen by the storage node, regardless of the type of storage employed by that storage volume, e.g., disk, a solid-state drive, a battery-backed RAM, a non-volatile RAM device (e.g., one or more NV-DIMMs) or another type of persistent storage device. An SSD is not necessarily mapped directly to hardware. For example, a single solid-state storage device might be broken up into multiple local volumes where each volume is split into and striped across multiple segments, and/or a single drive may be broken up into multiple volumes simply for ease of management, in different embodiments. In some embodiments, each SSD may store an allocation map at a single fixed location. This map may indicate which storage pages that are owned by particular segments, and which of these pages are log pages (as opposed to data pages). In some embodiments, storage pages may be pre-allocated to each segment so that forward processing may not need to wait for allocation. Any changes to the allocation map may need to be made durable before newly allocated storage pages are used by the segments.

FIG. 3 illustrates example contents of a change-data-capture log and a transport engine that transports change-data-capture items from the transactional database based on information stored to the change-data-capture log by a database engine used to implement the transactional database, wherein the transport engine stitches together schema information that is stored separately from payload contents in order to generate the change-data-capture items for transport, according to some embodiments.

In some embodiments, database engine head node 220 writes changes to storage volumes 302, such as via redo logs and/or updated data pages and additionally writes change-data-capture log information to change-data-capture log volume(s) 350. In some embodiments, the storage volumes and the change-data-capture log volumes may be stored in different protection groups. Also, in some embodiments, the contents of change-data capture log volume 350 may be included in storage volume 302, such that a combined volume is stored instead of separate storage volumes and change-data-capture log volumes.

The change-data-capture log volume 350 includes transaction table 352, change log table(s) 354, and schema table 356. The storage volumes 302 may provide durability and recovery for a database implemented using database engine head node 220. For example, the storage volumes may store changes using a write-ahead log (WAL). However, the storage volumes 302 may not generate full files of changes, but instead require WAL entries to be stitched together by the database engine head node 220 in order to generate change-data-capture items. Thus, a second change-data-capture log volume is used to generate change-data-capture items without burdening the database engine head node 220 with the task of stitching together entries in the write-ahead log to generate the change-data-capture items. Instead, this work may be done out-of-band by a separate computing resource, such as transport engine 310. For example, in some embodiments, transport engine 310 may be a separate virtual machine separate from database engine head node 220, that reads table information from change-data-capture log volume(s) 350 to generate change-data-capture items for transport to a recipient system.

Having the durability/recovery data written to a write-ahead log (WAL) may provide a higher insertion rate and lower storage costs, for example computing resources of database engine-head node 220 are not consumed in writing schema information for each transaction. Also, lower storage consumption results from refraining from writing schema information in-line with each change.

In order to store schema information for use in generating change-data-capture items while maintaining a low computational and storage overhead, a separate schema table 356 is maintained in the change-data-capture log volume 350. When a schema is first "seen" by database engine head node 220, the new schema is added to the local schema cache 244 (shown in FIG. 2) as well as being written to the schema table 356. This schema table entry is assigned a logical sequence number (LSN) from a number space used by database engine head node 220 to mark incoming changes. The LSN number associated with the schema is also stored in the local schema cache 244. Upon receipt of subsequent changes involving this schema, the payload contents of the subsequent changes (or transaction information for the subsequent changes) are augmented to include the LSN of the schema that is applicable to that change. Thus, new schemas are written potentially just once and later referenced using LSN identifiers. However, if the database engine head node 220 were to crash such that its local cache memory was cleared, upon re-start the database engine head node 220 would potentially re-write schema definitions to schema table 356 for schemas already included in the schema table 356. However, since such crash events are infrequent, there is only a minimal computational and storage penalty for this redundant writing of schema definitions. In such a case, subsequently received transactions would reference a newer LSN associated with the schema definition (when written to the schema table 356 the second time). Once all changes referencing the earlier schema definition entry (with the earlier LSN) have been exported, the schema table 356 can be garbage collected (e.g. the earlier schema definition made redundant by the second writing of the same schema definition can be deleted or otherwise marked for deletion).

More generally, for any update or insert (UPSERT) in the database, the transactional database system 200 generates corresponding storage log records. More specifically, for the change-data-capture log volumes, such changes (e.g. UPSERTs) are logged as both (1) a transaction having an LSN and (2) a change log comprising the payload contents of the change that is marked with the transaction LSN (or otherwise associated with the transaction LSN). In some embodiments, the transactions table 352 (e.g. where the transactions are logged) and the change log table(s) 354 (e.g. where the payload contents of the changes are logged) are maintained in separate protection groups (PGs).

With regard to schema, a new schema event (e.g. having its own LSN) is generated on every data definition language (DDL) command processed by the database engine head node 220. Each such schema event is assigned an LSN from the same number space used to assign LSNs to transactions. This may be referred to as a unique relation identifier (URID). The latest schema URID for every table managed by the database engine head node 220 is stored in the local schema cache 244 in the memory 232 of the database engine head node 220.

In some embodiments, the database engine head node 220 is responsible to ensure that every change (e.g. UPSERT) committed to the database has a corresponding schema present in the schema table 356 of the change-data-capture log volume 350. As mentioned above, the database engine head node 220 needs to guarantee at least one delivery of the schema definition to the schema table 356. However, multiple deliveries of the same schema definition is not an issue when they are associated with different LSNs and the database engine head node maintains a single LSN for the schema definition.

Also, the database engine head node 220 maintains, in its memory (e.g. schema memory 244) a lowest LSN of the schemas maintained in the memory (e.g., schema memory 244). This lowest LSN can be used by the transport engine 310 (or other engine) to perform garbage collection of schema table 356. Note that schemas no longer stored in the memory of the database engine head node can be garbage collected after being used to generate any in-flight change-data-capture items.

In some embodiments, the transport engine 310 also maintains a schema cache and only has to consult the schema table 356 if a needed schema definition is not stored in the local cache of the transport engine 310.

To generate change-data-capture items for transport, the transport engine 310 polls (312) the transaction table 352 for committed transactions. When committed transactions are found in the polling, the transaction LSN is then used to retrieve (314) the corresponding payload contents of that transaction from the change log table(s) 354. Also, if the schema indicated by a schema LSN included in the written payload contents stored in the change log table(s) 354 for that transaction is not locally stored in a cache of the transport engine 310, the transport engine 310 performs schema retrieval (316) using the LSN number of the associated schema (indicated in the payload contents) for the given transaction from the schema table 356. The transport engine 310 then stitches together the schema with the payload contents to generate a change-data-capture item for a given change (e.g. committed transaction). These are then provided to a recipient system such as data storage service 120, data streaming service 130, other services 140, and/or analytical database 150.

FIG. 4 illustrates a distributed storage system of a transactional database system, according to some embodiments.

In some embodiments, a distributed storage system of a transactional database system may resemble distributed storage system 210 of transactional database system 200, as shown in FIG. 4. In at least some embodiments, storage nodes 430-450 may store data for different clients as part of a multi-tenant storage service. In some embodiments, transactional database system 200 may be a client of distributed storage system 210, which communicates with a database engine head node 220 over interconnect 460. As in the example illustrated in FIG. 4, database engine head node 220 may include a client-side storage service driver 225. In this example, distributed storage system 210 includes multiple storage system server nodes (including those shown as 430, 440, and 450), each of which includes storage for data pages and redo logs for the segment(s) it stores and or tables for the change-data-capture logs it stores, and may further include hardware and/or software configured to perform various segment management functions. For example, each storage system server node may include hardware and/or software configured to perform at least a portion of any or all of the following operations: replication (locally, e.g., within the storage node), coalescing of redo logs to generate data pages, snapshots (e.g., creating, restoration, deletion, etc.), log management (e.g., manipulating log records), crash recovery (e.g., determining candidate log records for volume recovery), and/or space management (e.g., for a segment). Each storage system server node may also have multiple attached storage devices (e.g., SSDs) on which data blocks may be stored on behalf of clients (e.g., users, client applications, and/or database service subscribers). In some embodiments, storage system server nodes may provide multi-tenant storage, storing portions of different data volumes for different clients in the attached storage devices. Correspondingly, storage system server nodes may maintain numerous permanent keys for the different data volumes.

In some embodiments, as shown in FIG. 4, storage system server node 430 includes data page(s) 433, segment redo log(s) 435, segment management functions 437, monitor 449 and attached SSDs 471-478. Monitor 439 may report health statistics, performance measurements and any other information to volume manager 412 for distributed storage system management. A person having ordinary skill in the art should understand that the label "SSD" may or may not refer to a solid-state drive, but may more generally refer to a local block storage volume, regardless of its underlying hardware. Similarly, storage system server node 440 includes data page(s) 443, segment redo log(s) 445, segment management functions 447, and attached SSDs 481-488; and storage system server node 450 includes transaction table 352, change log table(s) 354, schema table 356, monitor 459, and attached SSDs 491-498. Note that for simplicity of illustration a single storage system server node (storage system server node 450) is shown storing the contents of the change-data-capture log volume 350, e.g. transaction table 352, change log tables 354, and schema table 356. However, in practice multiple ones of the storage system server nodes may be used to store the change-data capture log volume. Also, as mentioned above, in some embodiments, the contents of the change data capture volume may be included with a storage volume, such that the contents are not necessarily segregated into different volumes.

In some embodiments, each of the storage system server nodes in distributed storage system 210 may implement a set of processes running on the node server's operating system that manage communication with database engine head node 220, e.g., to receive redo logs, send back data pages, etc. In some embodiments, all data blocks written to the distributed storage system may be backed up to long-term and/or archival storage (e.g., in a remote key-value durable backup storage system).

Distributed storage system 210 may also implement a storage control plane. Storage control plane may be one or more compute nodes configured to perform a variety of different storage system management functions. For example, storage control plane may implement a volume manager 412, which may be configured to maintain mapping information or other metadata for a volume, such as current volume state, current writer, truncation tables or other truncation information, or any other information for a volume as it is persisted in varying different, extents, segments, and protection groups. Volume manager 412 may be configured to communicate with a client of storage system 210, such as client-side driver 225 in order to "mount" or "open" the volume for the client, providing client-side driver 225 with mapping information, protection group policies, and various other information necessary to send write and read requests to storage nodes 430-450. Volume manager 412 may be configured to provide the maintained information, including keys, to storage clients, such as database engine head node 220 or client-side driver 225 or to other system components such as recovery service agents implemented for volume recovery/repair service 414. For example, volume manager 412 may provide a current volume state (e.g., clean, dirty or recovery), current epoch indicator and/or any other information about the data volume.

In some embodiments, distributed storage system may implement volume recovery/repair service 414. Volume recovery/repair service 414 may be configured to monitor or evaluate the current data volume state and based, at least in part, on the evaluation, direct recovery service agent(s) to perform a recovery operation with respect to a data volume. For example, volume recovery/repair 414 service may determine that the state of a particular data volume has remained in recovery state in excess of a time threshold and, in response direct one or more recovery service agent(s) to perform a recovery operation for the data volume.

In some embodiments, volume recovery/repair 414 may detect recovery events for a data volume. For example, volume recovery/repair 414 may receive an indication from client-side storage service driver 225 or database engine head node 220 that the data volume may not be re-opened or used again by a writing client. Additionally, recovery event detection module may determine other recovery events that may include detecting that a lease has expired for data volume client-side storage service driver 225 or database engine head node 220, or may receive a release request or command to evict the database engine head node 320 from another component of the database service 200. More generally, volume recovery/repair 414 may detect any event which may trigger or require the performance of a recovery operation.

Volume recovery/repair 414 may also implement recovery service agent(s) (not illustrated) which may be individual or collections of computing systems, nodes or devices that are configured to perform recovery operations. Recovery service agent(s) may be provisioned (from other computing resources of distributed storage system 210 or another system of service provider network 100) or directed to perform a recovery operation by volume recovery/repair 414. Recovery service agent(s) may abort the performance of a recovery operation, if it is determined that a recovery operation for the same data volume is already complete. In order to repair data volumes, may need to enable access to encrypted data for the data stored at the different storage nodes. Thus, similar to client-side storage service driver 225, recovery service agent(s) may receive an encrypted version of permanent key(s) to a data volume and send them to those storage nodes storing the data volume.

Figure 5:
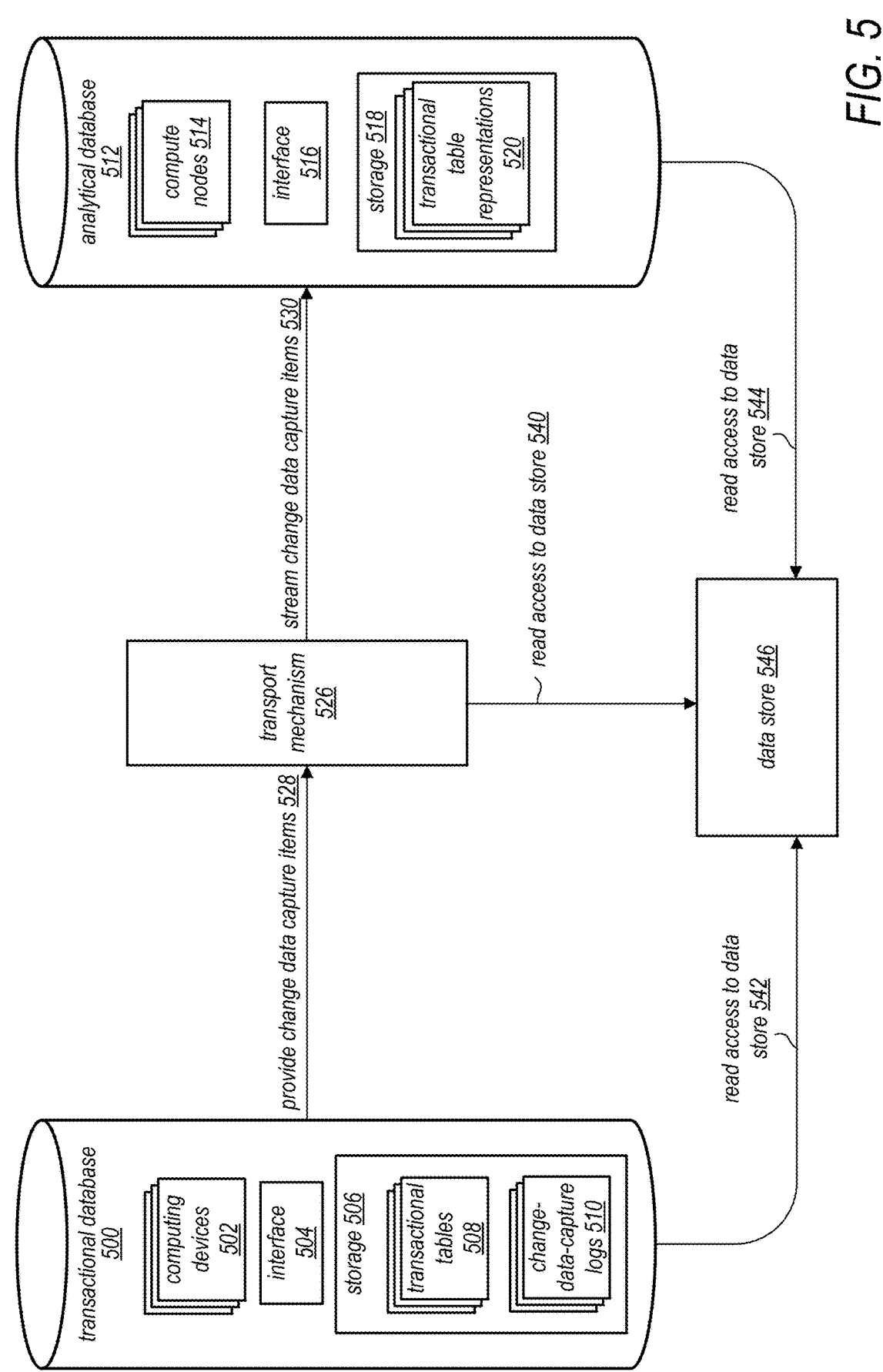
FIG. 5 illustrates the use of a transport mechanism to provide change-data-capture items from a transactional database to an analytical database, according to some embodiments.

FIG. 5 illustrates the use of a transport mechanism to provide change-data-capture items from a transactional database to an analytical database, according to some embodiments.

In some embodiments, transactional database 500, computing devices 502, interface 504, storage 506, transactional tables 508, and change-data-capture logs 510 may resemble a transactional database implemented by transactional database system 200. Similarly, analytical database 512, compute nodes 514, and interface 516 may resemble a recipient system, such as analytical database 150. In some embodiments, FIG. 5 may describe embodiments in which one or more change-data-capture items corresponding to transactional tables 508 have been provided to analytical database 512, and maintenance of the respective representations at analytical database 512 has already begun. As shown in FIG. 5, change-data-capture items 528 may be provided to analytical database 512 via transport mechanism 526 (and/or data store 546). The change-data-capture items 528 may then be used to update transactional table representations 520 within storage 518, according to some embodiments.

In some embodiments, change-data-capture items 528 and 530 may be provided to analytical database 512 via one or more transport mechanisms 526 that have been determined during performance of handshake protocol. As shown in FIG. 5, transactional database 500 and analytical database 512 may have read access to data store 546 (e.g., via read access 542 and 544, respectively) in order to read handshake results. In a first example in which transport mechanism 526 is implemented using data storage service 120, change-data-capture items may be provided to transport mechanism 526 via provided output 528 of transport engine 310 and may be stored in data stores of data storage service 120. In some embodiments, analytical database 512 may be provided access to said data stores of data storage service 120 such that the change-data-capture items 530 may be received to analytical database 512. In a second example in which transport mechanism 526 is implemented using data streaming service 130, change-data-capture items may be streamed to analytical database 512.

In some embodiments, the transport mechanism 526 may be integrated into the transaction database 500, or conversely may be implemented in the analytical database 512 as a "pull" mechanism that pulls change-data capture items ready for export from a change-data-capture log of transactional database 500. Also, in some embodiments, transport may be performed in a manner in which the exchange of handshake information is not needed, thus the handshake protocol may be optional.

Figure 6:
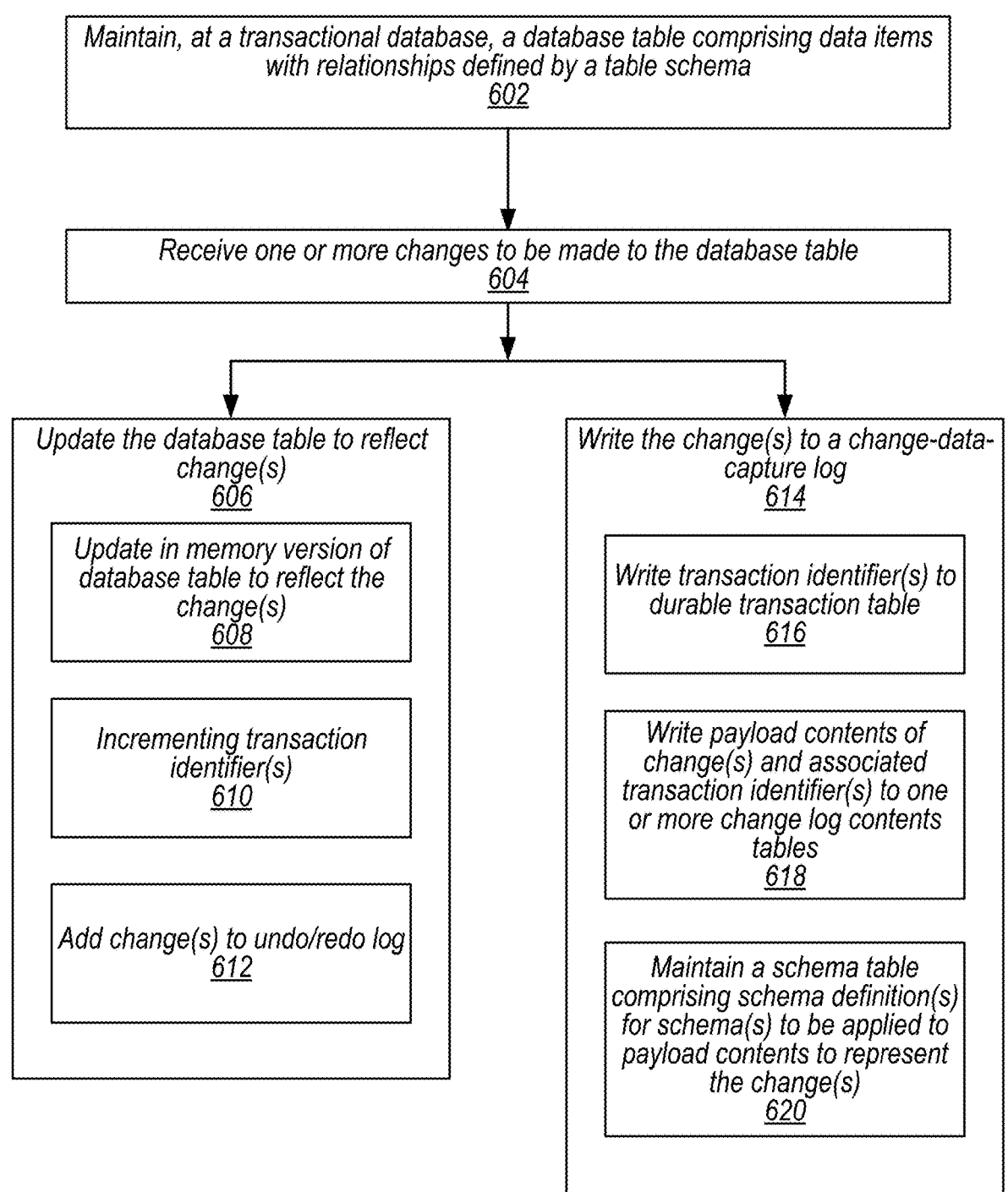
FIG. 6 is a flow diagram illustrating a process of storing changes in a transactional database and also recording the changes in a change-data-capture log, wherein schema information is stored separately from the change payload contents, according to some embodiments.

FIG. 6 is a flow diagram illustrating a process of storing changes in a transactional database and also recording the changes in a change-data-capture log, wherein schema information is stored separately from the change payload contents, according to some embodiments.

At block 602, a database engine of a transactional database maintains a database table comprising data items with relationships defined by a table schema. For example a MySQL or PostgreSQL format may be used. At block 604, the data base engine receives one or more changes to be made to the database table. Also, at block 606, the database engine updates the database table to reflect the changes and at block 614 writes the changes to a change-data-capture log.

In some embodiments, updating the database table to reflect the changes includes updating, at block 608, an in-memory version of the database table to reflect the changes, and, at block 610, incrementing a transition identifier and adding, at block 612, the changes to an undo log and/or redo log.

In some embodiments, writing the changes to a change-data-capture log includes, at block 616, writing a transaction identifier for the changes to a transaction table, such as transaction table 352, writing, at block 618, payload contents of the change(s) and associated transaction identifiers and schema identifiers to a one or more change log contents tables, such as change log tables 354, and maintaining, at block 620, a schema table, such as schema table 356, comprising schema definition(s) for schema(s) to be applied to payload contents to represent the change(s).

In some embodiments, instead of using two different engines (e.g. database engine head node 220 and transport engine 310), both steps 606 and 614 could be performed by the same engine, such as database engine head node 220. Though, in other embodiments, the tasks associated with step 606 are performed by the database engine head node 220, while the change data capture item tasks of step 614 are performed by the transport engine 310.

FIG. 7 is a flow diagram illustrating a process of transporting a change-data-capture log via change-data-capture items that are generated by stitching together separately stored schema information with payload contents for changes that have been written to the change-data-capture log, according to some embodiments.

Subsequent to, or in near-real time with, writing a committed change to the change-data-capture log (at block 614), a corresponding change-data-capture item is transported to a recipient system, e.g., at block 702. This may include performing the steps shown in blocks 704-714.

For example, at block 704, a transport engine, such as transport engine 310, polls the transaction table 352 for committed transactions. At block 706, the transport engine, then reads transaction identifiers (e.g. LSNs) for the committed transactions from the transaction table. At block 708, the transport engine reads the payload contents for the committed transactions from the change log tables 354, using the transaction identifiers read from the transaction table 352 to look up the corresponding payload data for the changes that has been stored in the change log tables 354. If not already in memory, at block 710, the transport engine reads the corresponding schemas to be applied to the payload contents for the changes to stitch them together to form a change-data-capture item. The appropriate schema is looked up using a schema LSN that was included with the change payload contents in an entry in the change log tables 354. At block 712, the transport engine applies the appropriate schemas to generate the change-data-capture items. Also, at block 714, the transport engine provides the generated change-data-capture items for transport via one or more transport mechanisms. Also, in some embodiments, instead of using a separate transport engine, the functionality of transport engine 310 (e.g. with regard to the tasks associated with step 702) may be performed by the database engine head node, such as database engine head node 220.

FIG. 8 is a flow diagram illustrating a process for performing garbage collection for payload contents stored to a change log contents table of a change-data-capture log, according to some embodiments.

At block 802, a transport engine, or other garbage collection worker, performs garbage collection on the change log contents tables, such as change tables 354. To perform the garbage collection, at block 804, the worker determines a logical sequence number used in a transaction identifier of a latest change that has been successfully provided for transport. Then, at block 806, the worker marks for garbage collection change payload contents for changes that have already been transported, based on the changes having lower associated logical sequence numbers than the determined logical sequence number of the latest change that has been successfully provided for transport.

Note that even though the schemas and the transactions share a common logical number space, garbage collection can be performed on the change log tables separately (e.g. using a different minimum LSN) without impacting the schema table. Thus, changes with later LSNs than an earliest LSN still active in the schema table can be garbage collected.

FIG. 9 is a flow diagram illustrating a process for performing garbage collection for schemas stored in a schema table of a change-data-capture log, according to some embodiments.

At block 902, a transport engine, or other garbage collection worker, performs garbage collection on the schema table 356. In order to perform the garbage collection, at block 904, the worker determines a lowest logical sequence number of a schema that has a schema definition stored in memory at the database engine. Then, at block 906, the worker marks for garbage collection schemas having lower logical sequence numbers than the lowest logical sequence number associated with a schema still stored in the in-memory cache of the database engine.

Figure 10:
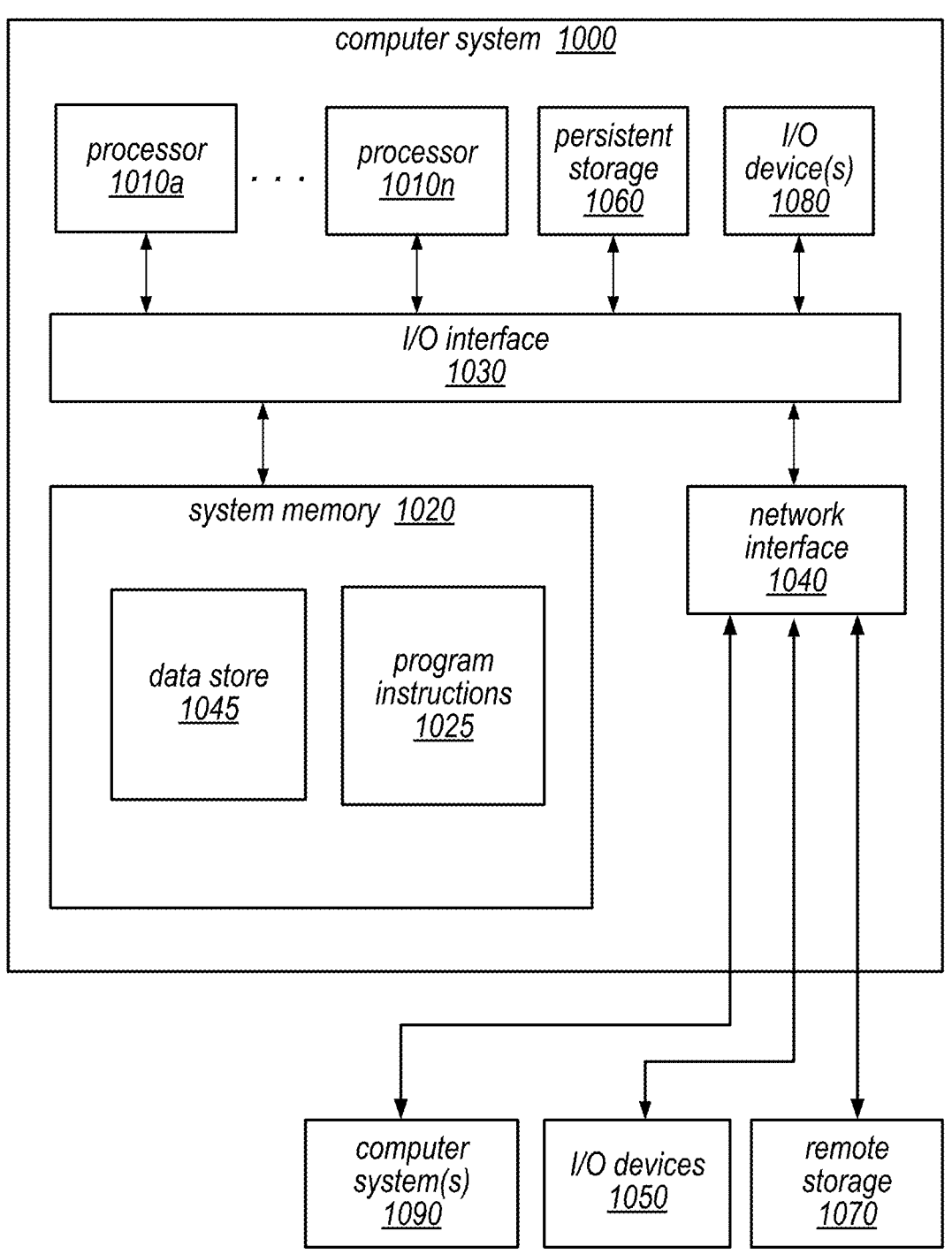
FIG. 10 is a block diagram illustrating an example computing device that may be used in at least some embodiments.

Embodiments of the processing methods and systems described herein may be executed on one or more computer systems, which may interact with various other devices. One such computer system is illustrated by FIG. 10. FIG. 10 is a block diagram illustrating a computer system that may implement at least a portion of the systems described herein, according to various embodiments. For example, computer system 1000 may implement a database engine head node of a database tier, or one of a plurality of storage nodes of a separate distributed storage system that stores databases and associated metadata on behalf of clients of the database tier, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory

1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 660, as desired, and may retrieve the stored instruction and/or data as needed. For example, in some embodiments, computer system 1000 may host a storage node, and persistent storage 1060 may include the SSDs attached to that server node.

Computer system 1000 includes one or more system memories 1020 that may store instructions and data accessible by processor(s) 1010. In various embodiments, system memories 1020 may be implemented using any suitable memory technology, (e.g., one or more of cache, static random-access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a database engine head node of a database tier, or one of a plurality of storage nodes of a separate distributed storage system that stores databases and associated metadata on behalf of clients of the database tier, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be implemented as described herein. For example, the information described herein as being stored by the database tier (e.g., on a database engine head node), such as a transaction log, an undo log, cached page data, or other information used in performing the functions of the database tiers described herein may be stored in data store 1045 or in another portion of system memory 1020 on one or more nodes, in persistent storage 1060, and/or on one or more remote storage devices 1070, at different times and in various embodiments. Similarly, the information described herein as being stored by the storage tier (e.g., redo log records, coalesced data pages, and/or other information used in performing the functions of the distributed storage systems described herein) may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 20 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more web services. For example, a database engine head node within the database tier of a database system may present database services and/or other types of data storage services that employ the distributed storage systems described herein to clients as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGs. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
one or more computing devices, wherein the one or more computing devices are configured to:
implement a transactional database;
maintain, at the transactional database, a database table comprising data items; and
write, at the transactional database, changes made to the database table to a change-data-capture log, wherein writing the changes to the change-data-capture log comprises:
writing transaction identifiers for the changes to a transaction table;
writing payload contents of the changes to one or more change log contents tables; and
maintaining a schema table comprising schema definitions for schemas to be applied to the payload contents to represent the changes; and
one or more computing devices configured to implement a transport mechanism, wherein the transport mechanism is configured to:
read committed changes from the transaction table;
generate change-data-capture items for the committed changes, wherein generating the change-data-capture items comprises:
reading, for a given committed change, payload contents for the given change from the one or more change log contents tables; and
applying a corresponding schema definition from the schema table to the payload contents read from the one or more change log contents tables, wherein the schema definition to be applied is identified based on an identifier associated with the change and a corresponding identifier included in the schema table; and
provide the change-data-capture items.

2. The system of claim 1, wherein the one or more computing devices configured to implement the transactional database are further configured to:
store transaction identifiers for a given set of changes in a local cache;
store undo logs for the given set of changes in a local cache; and
maintain, in the local cache, schemas used by the given set of transactions stored in the local cache.

3. The system of claim 2, further comprising:
one or more computing devices configured to implement a storage service,
wherein the one or more computing devices configured to implement the transactional database are further configured to:
flush the given set of changes stored in the local cache and the schemas maintained in the local cache in response to a crash event.

4. The system of claim 1, wherein the one or more computing devices configured to implement the transport mechanism are configured to:
poll the transaction table for committed changes; and
perform said reading the payload content for the committed changes and said generating the change-data-capture items, for the committed changes, based on the polling of the transaction table.

5. The system of claim 1, wherein to maintain the schema table the one or more computing devices configured to implement the transactional database are further configured to:
write a schema entry for a schema in the schema table, wherein the schema entry comprises a unique identifier associated with the schema and a schema definition for the schema;
maintain, in a local cache, the schema definition for the schema and the unique identifier associated with the schema; and
for subsequent changes involving the schema, mark the payload contents for the subsequent change with the unique identifier for the schema associated with the subsequent change.

6. The system of claim 5, wherein unique identifiers assigned to schemas and transaction identifiers assigned to changes are selected from a shared space of monotonically increasing logical sequence numbers.

7. The system of claim 5, wherein the one or more computing devices configured to implement the transport mechanism are further configured to:
perform garbage collection on the change log contents tables, wherein payload contents for changes having logical sequence numbers less than a lowest logical sequence number of a given change for which a change-data-capture item has already been provided are marked for garbage collection.

8. The system of claim 5, wherein the one or more computing devices configured to implement the transport mechanism are further configured to:
perform garbage collection on the schema table, wherein schemas having logical sequence numbers less than a lowest logical sequence number of schemas stored in local cache at the one or more computing devices implementing the transactional database are marked for garbage collection.

9. The system of claim 1, wherein the transaction table, the one or more change log contents table, and the schema table are implemented using one or more logical volumes that are at least partially replicated across distributed storage devices.

10. The system of claim 1, further comprising:

one or more compute nodes organized into a node cluster, wherein the one or more compute nodes are configured to:

implement an analytical database; and maintain, at the analytical database, a representation of at least one portion of the database table, wherein to maintain the representation of the at least one portion of the database table at the analytical database comprises committing respective ones of the changes of the change-data-capture items, received at the analytical database, to the representation;

wherein:

the transactional database and the analytical database are part of a service provider network; and the transport mechanism further uses a data storage service of the service provider network to transport change-data-capture items between the transactional database and the analytical database.

11. The system of claim 1, wherein:

the transactional database is included in a service provider network; and a data streaming service of the provider network receives the provided change-data-capture items.

12. A method comprising:

maintaining a database table comprising data items;

receiving transactions indicating changes to be made to the database table;

updating the database table to reflect the changes; and writing the changes made to the database table to a change-data-capture log, wherein writing the changes to the change-data-capture log comprises:

writing transaction identifiers for changes to a transaction table;

writing payload contents of the changes to one or more change log contents tables; and maintaining a schema table comprising schema definitions for schemas to be applied to the payload contents to represent the changes.

13. The method of claim 12, further comprising:

transporting the change-data-capture log to a recipient system, wherein said transporting the change-data-capture-log comprises:

reading committed changes from the transaction table;

generating change-data-capture items for transport, wherein said generating the change-data-capture items comprises:

reading, for a given committed transaction, payload contents for the given transaction from the one or more change log contents tables; and applying a corresponding schema definition from the schema table to the payload contents read from the one or more change log contents tables, wherein the schema definition to be applied is identified based on an identifier associated with change and a corresponding identifier included in the schema table; and providing the change-data-capture items for transport.

14. The method of claim 12, wherein maintaining the database table comprising the data items comprises:

storing changes in a local cache of a database node; and maintaining, in the local cache, schemas used by changes stored in the local cache;

the method further comprising:

flushing the changes stored in the local cache and the schemas maintained in the local cache in response to a crash event.

15. The method of claim 12, further comprising:

performing garbage collection on the change log contents tables, wherein payload contents for changes having logical sequence numbers less than a lowest logical sequence number of a change for which a change-data-capture item has been provided are marked for garbage collection.

16. The method of claim 15, further comprising:

performing garbage collection on the schema table, wherein schemas having logical sequence numbers less than a lowest logical sequence number of schemas stored in local cache at the one or more computing devices implementing the transactional database are marked for garbage collection.

17. The method of claim 12, further comprising:

maintaining, at an analytical database, a representation of at least one portion of the database table, wherein to maintain the representation comprises committing respective ones of the changes of the change-data-capture items, received at the analytical database, to the representation.

18. One or more non-transitory, computer-readable, storage media storing program instructions that, when executed on or across one or more processors, cause the one or more processors to:

read committed transactions from a transaction table;

generate change-data-capture items for transport, wherein said generating the change-data-capture items comprises:

reading, for a given committed change, payload contents for the given change from one or more change log contents tables; and applying a corresponding schema definition from a schema table to the payload contents read from the one or more change log contents tables, wherein the schema definition to be applied is identified based on an identifier associated with the change and a corresponding identifier included in the schema table; and provide the change-data-capture items for transport to a recipient system.

19. The one or more non-transitory, computer-readable, storage media of claim 18, wherein the program instructions, when executed on or across the one or more processors, further cause the one or more processors to:

perform garbage collection on the change log contents tables, wherein payload contents for changes having logical sequence numbers less than a lowest logical sequence number of a change for which a change-data-capture item has already been provided are marked for garbage collection.

20. The one or more non-transitory, computer-readable storage media of claim 18, wherein the program instructions, when executed on or across the one or more processors, further cause the one or more processors to:

perform garbage collection on the schema table, wherein schemas having logical sequence numbers less than a lowest logical sequence number of schemas stored in local cache at the one or more computing devices implementing the transactional database are marked for garbage collection.

* * * * *